FIG. 5

TIMING CONTROL

SUPERVISORY LINE SCAN

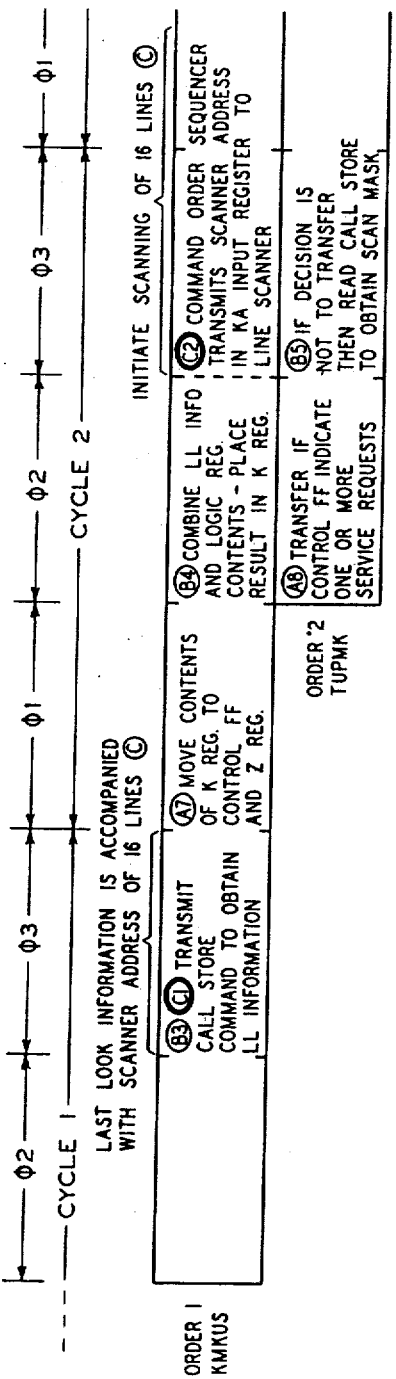

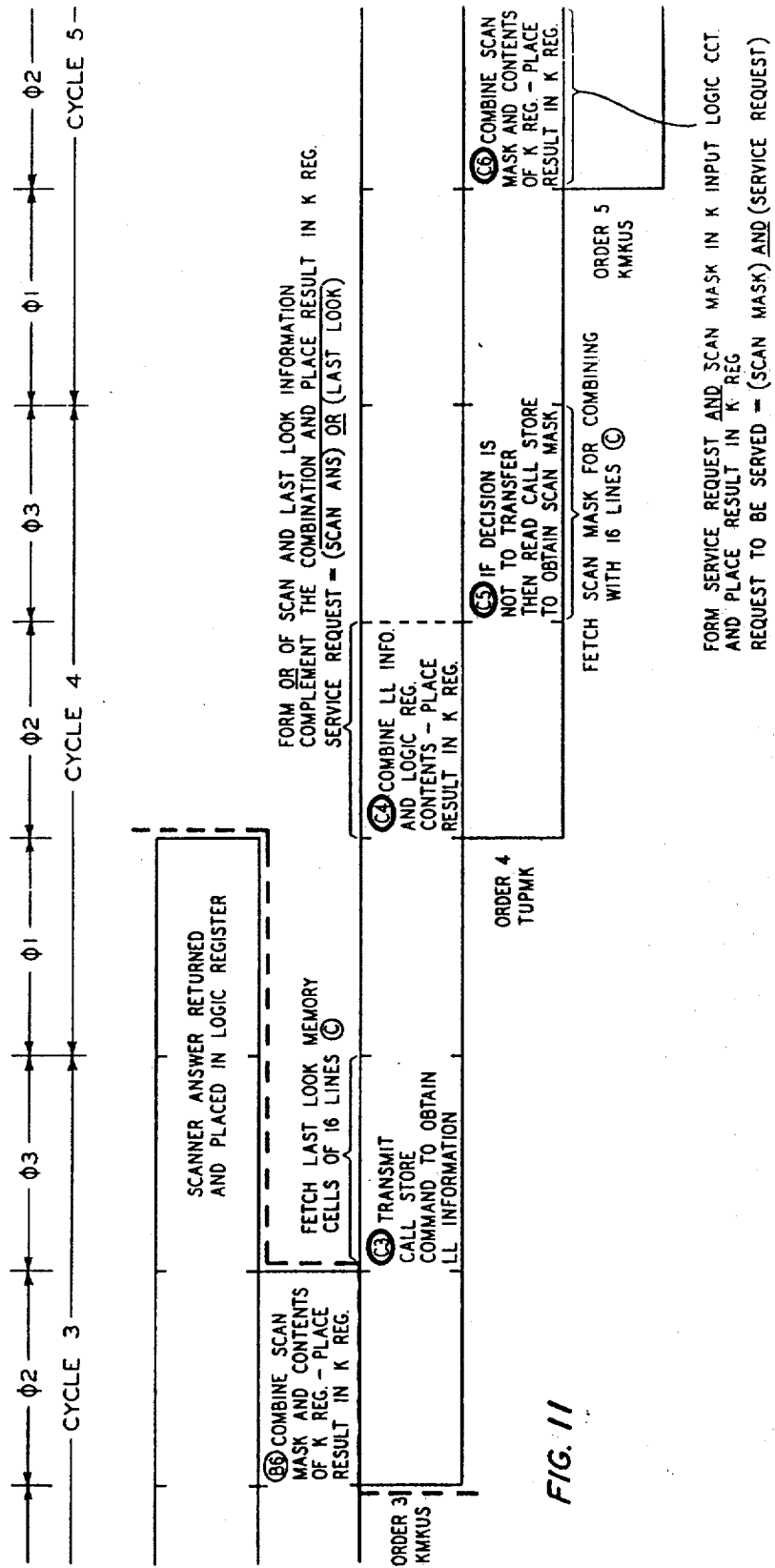

FIG. 13

| FIG.1 | FIG. 2 |
|---|---|
| FIG. 3 | FIG. 4 |
| | FIG. 5 |
| | FIG. 6 |

FIG. 14

| FIG. 10 | FIG. 11 | FIG. 12 |
|---|---|---|

FIG. 15

| BIT POSITIONS | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| SCANNER ANSWER WORD ROW N IN REGISTER 2508 | 1 | 1 | 1 | 1 | 1 | 1 | 1 | 0 | 0 | 0 | 0 | 1 | 1 | 0 | 0 | 1 | 1 | 0 | 0 | 1 | 1 | 1 | 0 |
| LAST LOOK WORD ROW N OBTAINED FROM MEMORY 103 | 1 | 0 | 1 | 0 | 1 | 1 | 1 | 0 | 1 | 1 | 0 | 0 | 0 | 0 | 1 | 0 | 0 | 1 | 0 | 1 | 0 | 1 | 0 |
| | | | | | | | | 0 | 1 | 1 | 0 | 0 | 1 | 1 | 1 | 1 | 1 | 1 | 0 | 1 | 1 | 1 | 0 |
| SERVICE REQUEST WORD FORMED AT OUTPUT OF CIRCUIT 2000 | | | | | | | | 1 | 0 | 0 | 0 | 0 | 0 | 0 | 0 | 0 | 0 | 0 | 1 | 0 | 0 | 0 | 0 |
| LINE LOAD CONTROL MASK WORD OBTAINED FROM MEMORY 103 | | | | | | | | 1 | 0 | 0 | 0 | 0 | 0 | 0 | 0 | 0 | 0 | 0 | 0 | 0 | 0 | 0 | 0 |
| LINE LOAD CONTROL SERVICE REQUEST WORD | | | | | | | | 1 | 0 | 0 | 0 | 0 | 0 | 0 | 0 | 0 | 0 | 0 | 0 | 0 | 0 | 0 | 0 |

ADDRESS FOR SCANNER ROW N+1

"OR" BITS (0-15 ONLY) → COMPLEMENT → "AND" →

United States Patent Office 3,517,123
Patented June 23, 1970

3,517,123
SCANNER CONTROL MEANS FOR A STORED PROGRAM CONTROLLED SWITCHING SYSTEM
John A. Harr, Geneva, Frank F. Taylor, West Chicago, and Werner Ulrich, Glen Ellyn, Ill., assignors to Bell Telephone Laboratories, Incorporated, New York, N.Y., a corporation of New York
Original application Dec. 31, 1963, Ser. No. 334,875. Divided and this application Nov. 24, 1967, Ser. No. 685,600
Int. Cl. H04q *3/54;* H04m *3/22*
U.S. Cl. 179—18
13 Claims

ABSTRACT OF THE DISCLOSURE

A program controlled telephone switching system in which lines and trunks are organized in groups corresponding to word organized information in a bulk memory. The lines and trunks of each group for purposes of detecting requests for service are scanned simultaneously to generate a scanner response word. The scanner response word is combined with selected data obtained from memory to form a service request word. The selected data includes a "line load control word" which is selected in accordance with the system traffic conditions.

The system work functions relative to the detection of requests for service for several groups of lines are performed on an overlap basis to minimize the processor time required for this function.

CROSS REFERENCES TO RELATED APPLICATIONS

This is a division of copending application, Ser. No. 334,875, filed Dec. 31, 1963, and relates to a communication switching system.

BACKGROUND OF THE INVENTION

The primary function of a communication switching system is the interconnection of the lines and trunks of the system in accordance with call signaling information obtained from the lines and trunks. Call signaling information includes signals emanating from equipments terminating the lines. Among the signals are those generated by an equipment change of state. Illustratively, telephone on-hook to off-hook transitions are indicative of a service request. Also, telephone off-hook to on-hook transitions are indicative of call termination. Likewise, other signals such as switchhook flashes are indicative of a desire for further attention during the course of a call, while dial pulses, TOUCH-TONE, multifrequency and voice signals are used to indicate the desired destination of a call.

In prior art electromechanical systems the detection of call signaling information is performed by large numbers of unifunctional circuits; however, with the introduction of high speed electronic telephone switching systems the detection and interpretation of call signaling information is performed by a single or, at the most, a few electronic circuit arrangements. These electronic circuit arrangements serve to scan the lines and trunks to detect the current supervisory state of the line or trunk, to compare this state with the immediately preceding state and from this comparison derive indications of a request for service, hangup and dial pulses. In a telephone switching system subscriber lines are examined at a relatively slow rate (once every 100 milliseconds) to detect requests for service. After a request has been noted the line must be scanned more rapidly (approximately once every 10 milliseconds) to detect dial pulses or other call signaling information. It is apparent that in large telephone offices, for example, offices serving in the order of 10,000 or more lines, the scanning of these lines and the associated trunks at even the slower rate of once per 100 milliseconds is a formidable task. Prior art systems scan a line at a time and upon detection of a request interrupt the scanning to serve that request, whether it be a reqest for service, a request for hangup, or a request for further attention, etc.

In addition to merely detecting changes in supervisory state, the system must be organized to cope with transient emergency conditions which bring about unusually high call origination surges. For example, upon the occurrence of a natural or other disaster in a particular locality, the telephone calling rate immediately rises to extremely high proportions since people are anxious to communicate with officials, friends and relatives. Such situations are most unusual and often the telephone handling capacity of an office is exceeded. Unless steps are taken to cope with such extreme overload conditions, the facility of an office may be effectively blocked and, although many subscribers are awaiting service, it is possible that substantially none of the calls can be processed.

It is an object of this invention to minimize the processor time required for the detection of requests for service from lines and trunks served by the communication switching system.

It is a further object of this invention to apply variable overload control in accordance with system traffic conditions.

SUMMARY OF THE INVENTION

In accordance with this invention the communication paths, i.e., the lines and trunks of the system, are arranged in ordered groups; and the system comprises: scanning arrangements for determining the supervisory states of the groups of paths; a program controlled data processor which comprises a memory system containing sequences of program order words and data and a control arrangement for obtaining information from the memory system, for writing information into the memory system, for executing the sequences of program order words and for generating commands for controlling the scanner arrangement. The scanner arrangement in response to the scanner commands scans a particular group of paths to determine the supervisory states of the scanned paths and generates and transmits to the control arrangement a scanner response word comprising indicia representative of the supervisory states of the scanned paths. The control arrangement logically combines the scanner response word and selected data obtained from memory to form a service request word. The selected data obtained from memory comprises communication path last-look information which contains indicia defining the supervisory state of the corresponding communication paths as determined by an immediately preceding scan and a line load control word. The line load control words comprise an ordered set of words wherein "1's" are discretely placed within the words to effect desired line load control functions. At times of extreme traffic overload, a line load control word which precludes service to all except certain emergency lines is employed. In the absence of an overload condition, the line load control word permits service to all lines and trunks of a group. Between these two extreme traffic conditions service may be rendered to lines and trunks on a partial basis and under these conditions a series of line load control words are selectively employed during successive intervals of time to provide serivce to successive groups of lines and trunks.

Advantageously, system functions relative to the detection of requests for service from lines and trunks served by the system are performed on an overlap basis with respect to several groups of communication paths. In the illustrative telephone switching system, the control arrangement employs a basic machine cycle having a time duration of 5.5 microseconds and the maximum rate at which the scanner arrangement commands may be transmitted is once every two machine cycles. The system functions relative to the detection of a request for service require approximately seven machine cycles. However, by means of overlap operation, communication paths may be scanned at the maximum rate at which the scanner arrange may be re-addressed. That is, communication paths are scanned at the rate of one group of paths each two machine cycles.

In accordance with one feature of this invention, the communication paths of a telephone switching system are arranged in ordered groups and the system functions relative to the detection of requests for service are performed on a group basis.

In accordance with another feature of this invention, variable line load control is employed to prevent processor overload.

BRIEF DESCRIPTION OF THE DRAWINGS

FIGS. 1 through 6, arranged as shown in FIG. 13, are a schematic representation of a telephone switching system in accordance with this invention;

FIGS. 10 through 12, arranged as shown in FIG. 14, illustrate control functions during execution of a scanning sequence; and FIG. 15 shows the combining of data in accordance with this invention.

GENERAL DESCRIPTION

Figure 1:
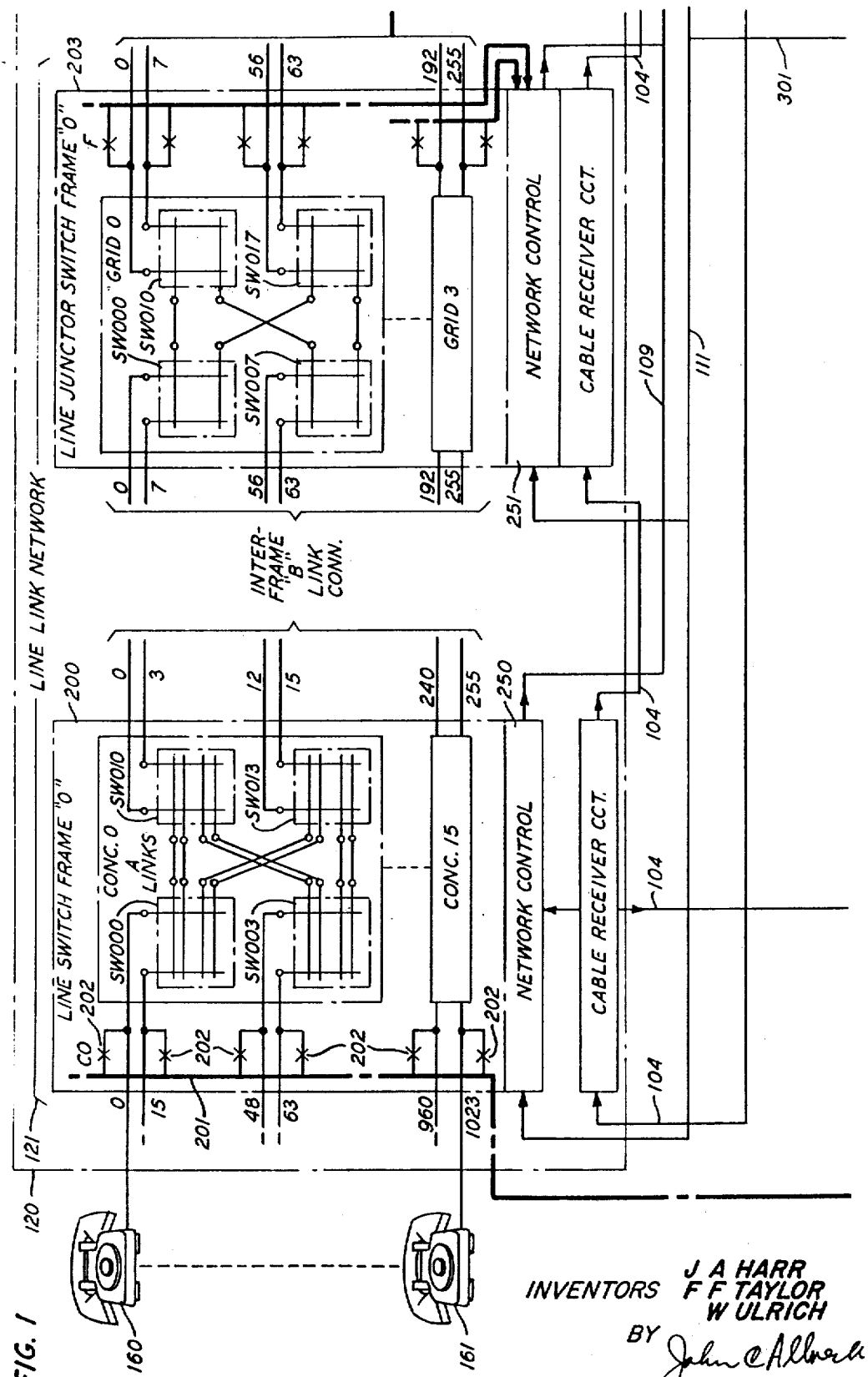
Figure 2:
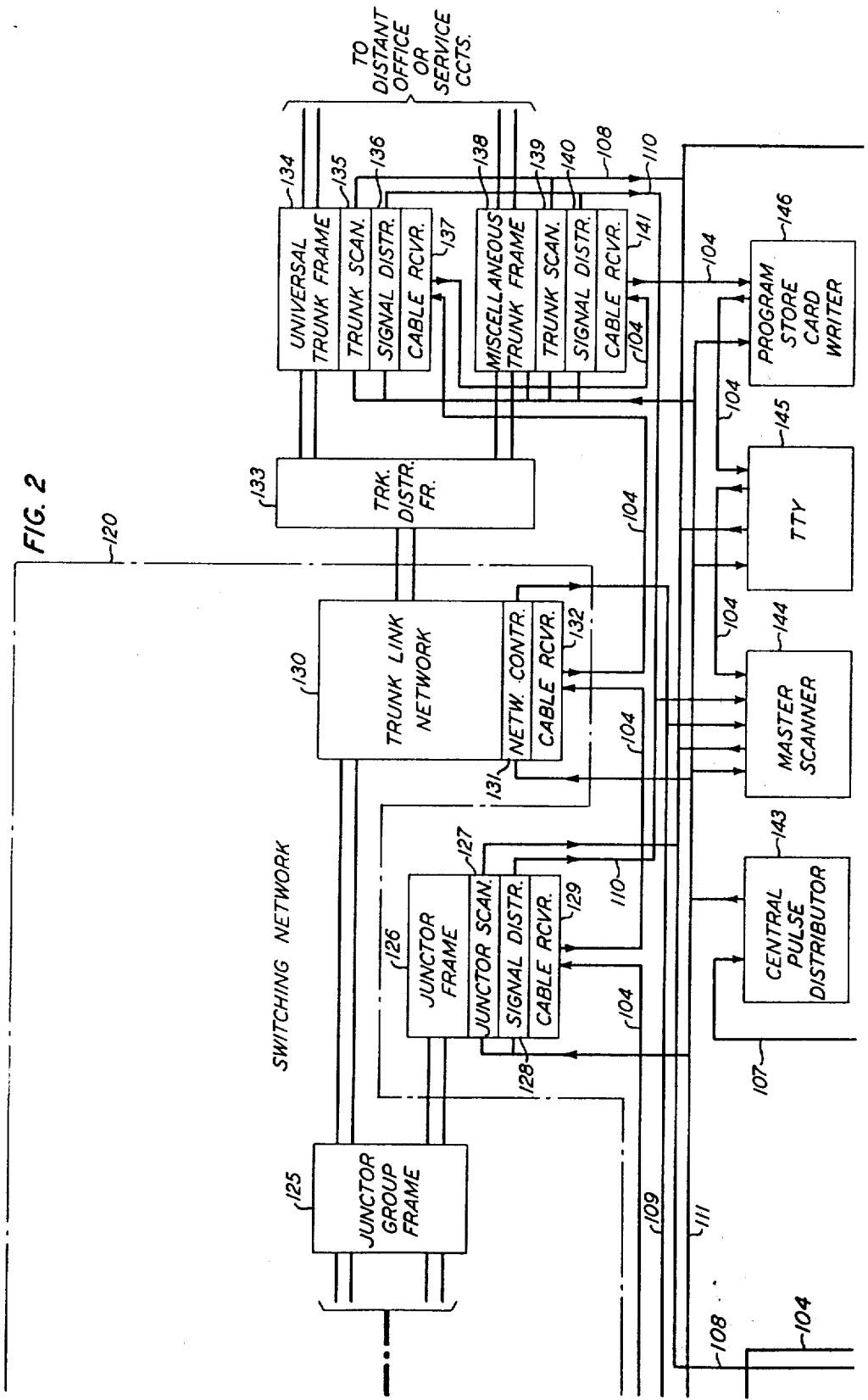

The organization of a communication switching system in accordance with this invention is shown in FIGS. 1 through 6. FIGS. 1 and 2 show the Communication Switching Network 120, the Subscribers' Stations 160 and the various trunk circuits which are located on the Trunk Frames 134 and 138. The Subscribers' Stations 160 are connected to the Switching Network 120 by means of subscriber lines, and the trunk circuits of the Trunk Frames 134 and 138 are connected by means of trunks to the Switching Network 120 via the Trunk Distributing Frame 133. FIG. 2 further shows the Central Pulse Distributor 143, the Master Scanner 144, the Teletypewriter 145 and the Program Store Card Writer 146. The Central Pulse Distributor 143 is a high speed electronic translator which, in response to pulse distributor commands from the Control Arrangement 101 over the Conductor Group 107, provides short duration pulses for controlling various elements of the communication switching system.

Figure 4:
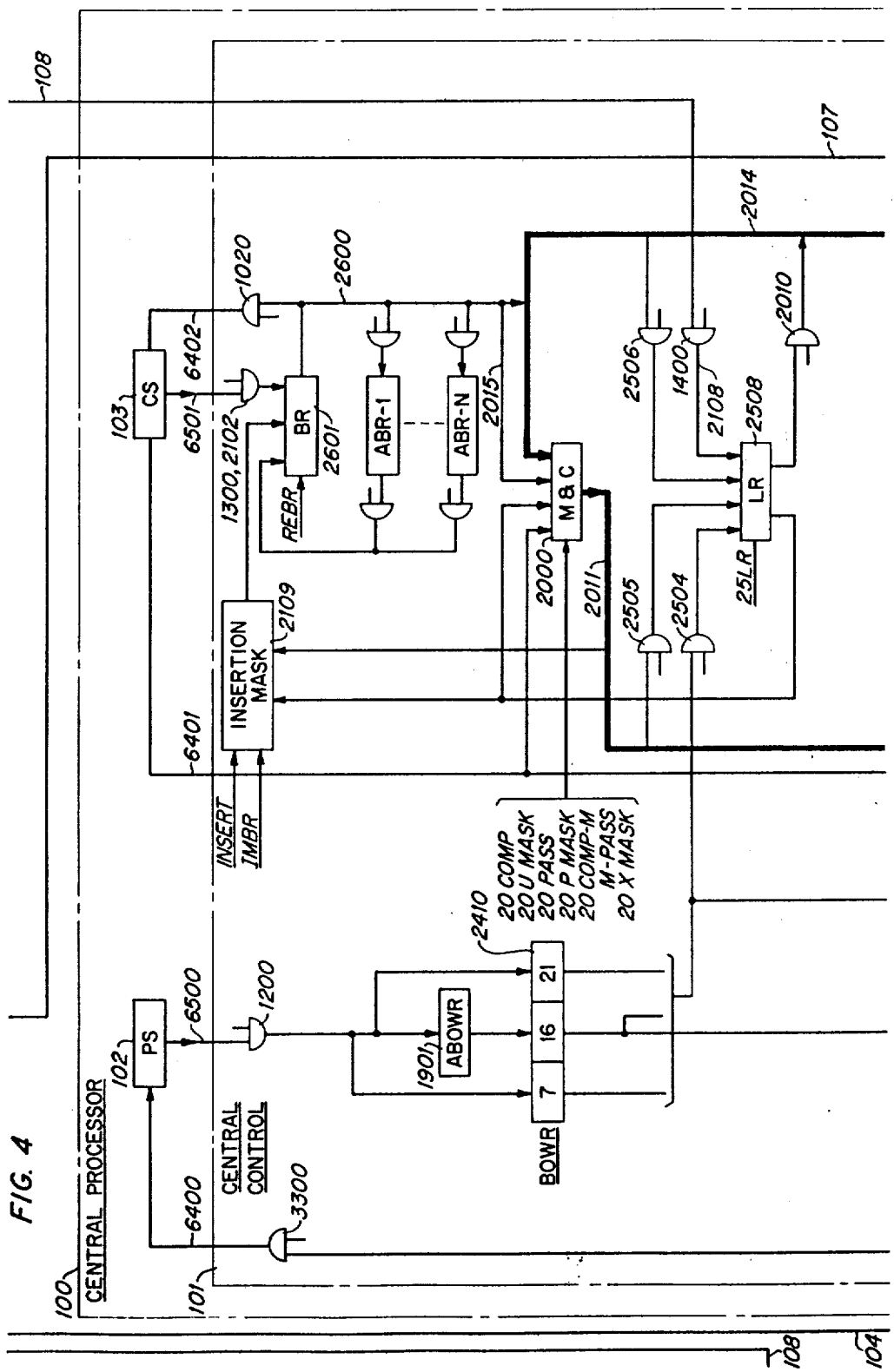
Figure 5:
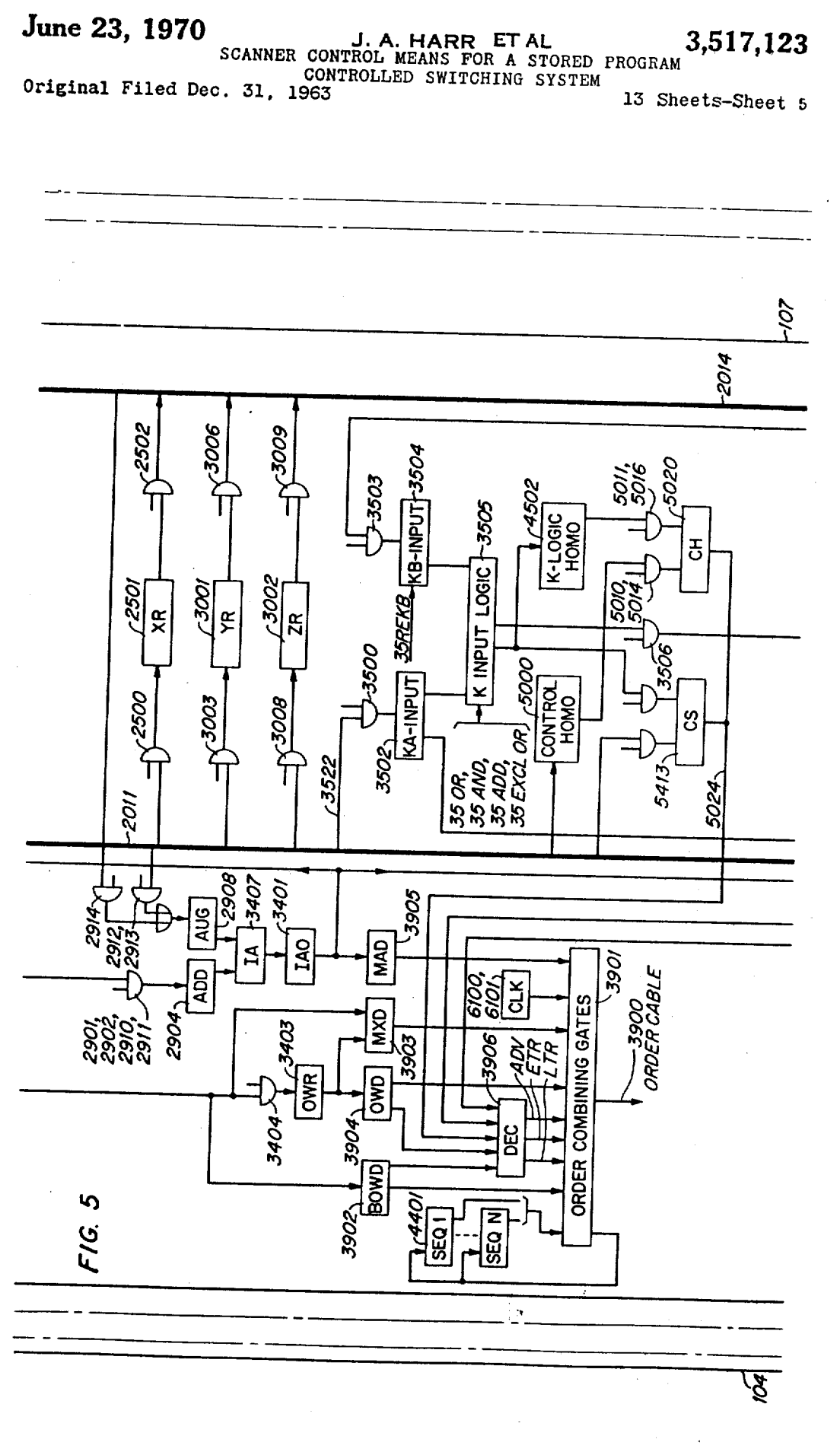
Figure 6:
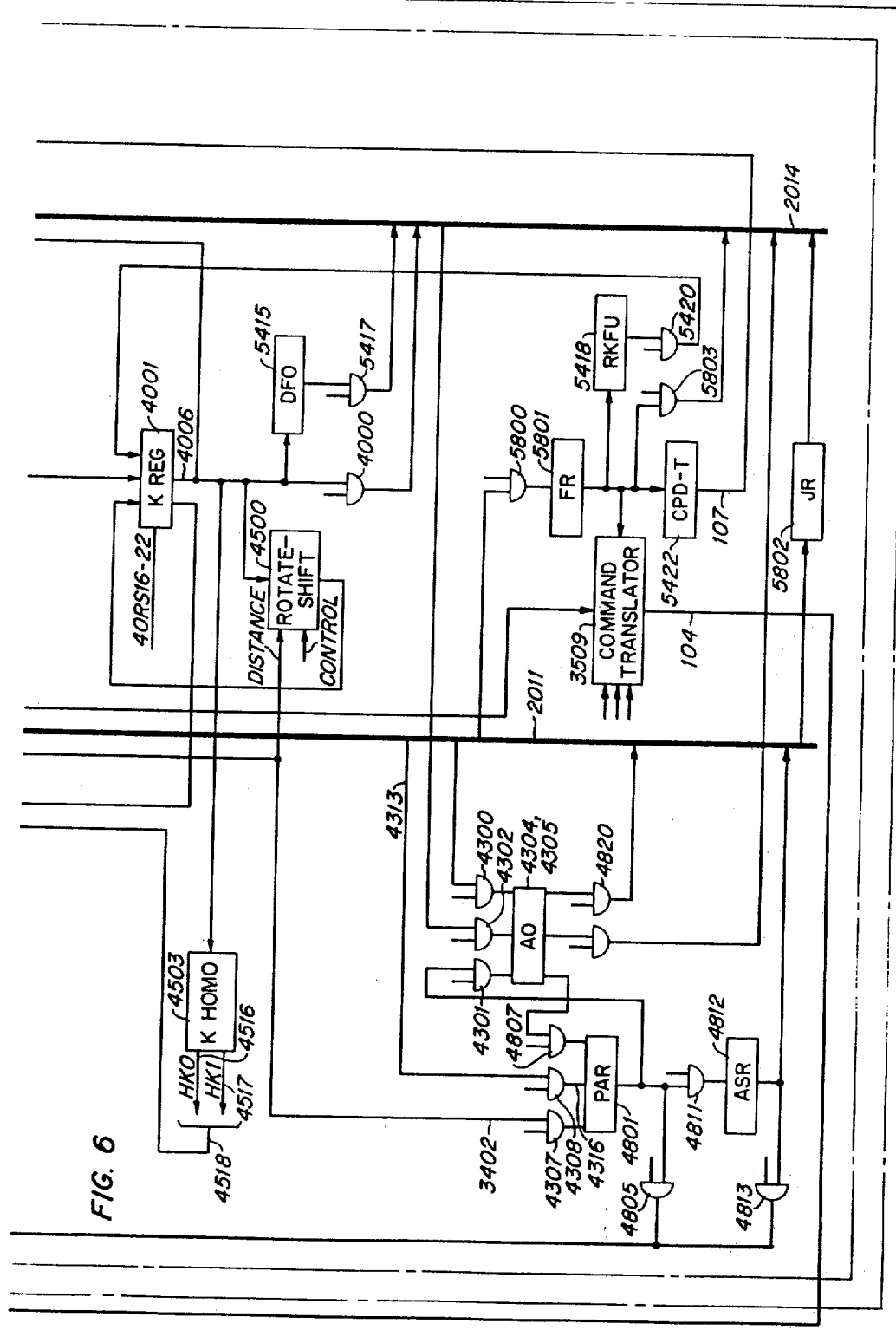

The Master Scanner 144 responds to commands from the Control Arrangement 101 of FIGS. 4 through 6 to detect the states of various equipments in the system.

The Teletypewriter 145 is employed by the office personnel to insert new information into the communication switching system and to obtain administrative information generated by the system.

The Program Store Card Writer 146 is a mechanism for preparing new information cards for the Program Store 102.

Figure 3:
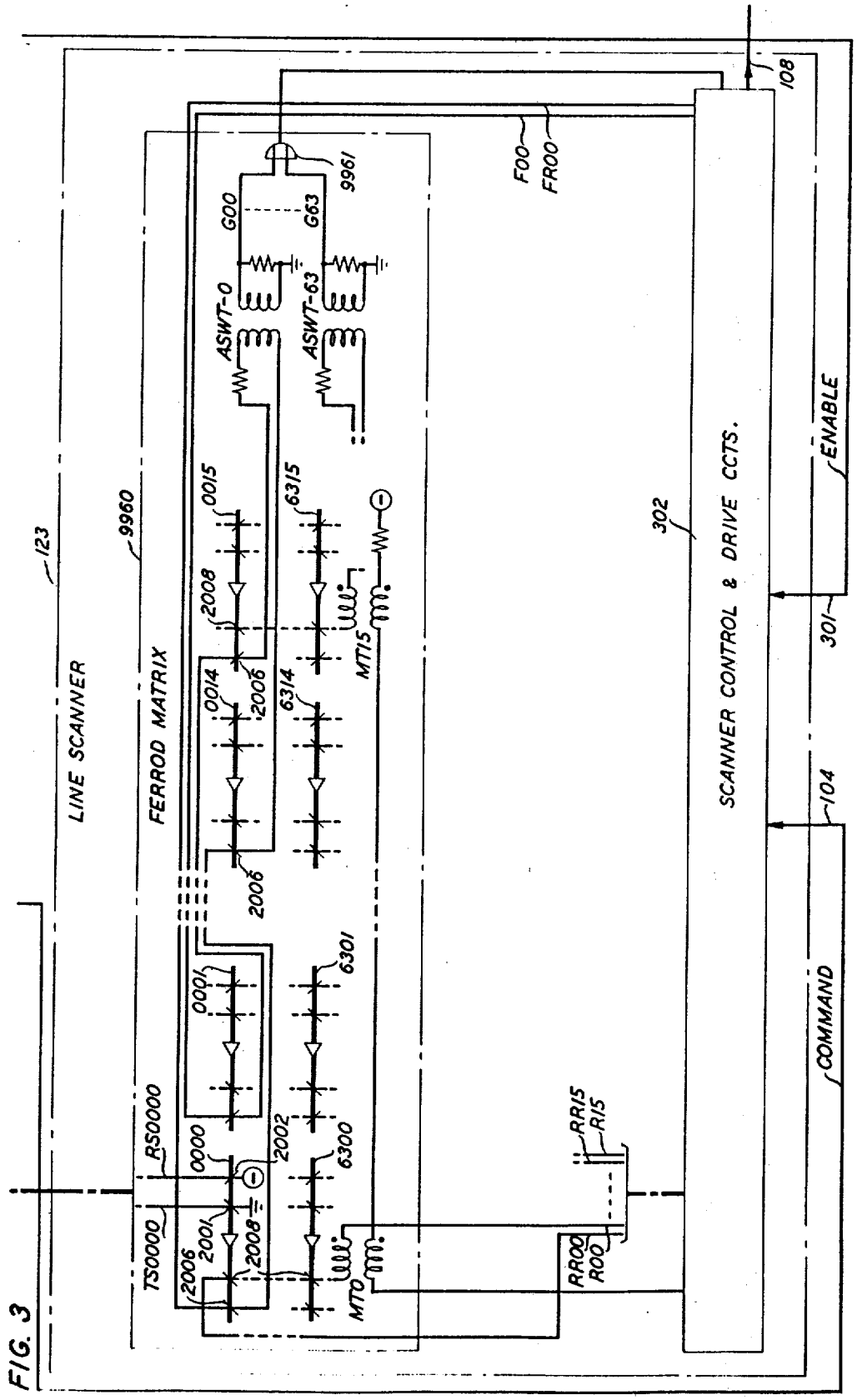

In FIG. 3 there is shown a Line Scanner 123. In the illustrative embodiment, the Subscribers' Lines 160 are arranged in ordered groups of sixteen lines per group for purposes of scanning. This grouping of communication path circuits is shown in the Ferrod Matrix 9960 of FIG. 3. In this figure there are shown two of a plurality of horizontal rows of ferrods. The first row comprises ferrods 0000 through 0015 and the last row comprises ferrods 6300 through 6315. The scanner of FIG. 3 is arranged to accept command signals from the Central Control 101 of FIGS. 4, 5 and 6 and to interrogate a particular row of ferrods indicated by the command. The Scanner 123 generates a scanner response word wherein there is discrete indicia representative of the supervisory state of each line of a group of lines. The scanner response word is generated in the Scanner Control and Drive Circuits 302 of FIG. 3 and is transmitted to the Central Control 101 via the Conductor Group 108. Information on Conductor Group 108 is transmitted through the Gate Circuits 1400 to the Logic Register 2508.

The Central Control 101 selectively obtains related data from the Call Store 103 and this data is returned to the Buffer Register 2601 via the Conductor Group 6501 and the Gate Circuits 2102. In accordance with the invention, the selected related data comprises at least a last-look word. The last-look word in the illustrative embodiment is a 23-bit data word wherein the rightmost sixteen bit positions contain indicia representative of the supervisory states of the related group of lines as determined by the immediately preceding scan of those lines. The left seven bit positions of the last-look word comprise the seven least significant address bits for the next scanner row. For example, if the last-look word shows the busy-idle states of the communication paths of row X, the address accompanying this word will comprise the seven least significant bit positions of the address of scanner row $X+1$.

The Central Control 101 is arranged to control the Circuit 2000 and internal gating of the Central Control 101 to combine the contents of the LR Register 2508 and the contents of the Buffer Register 2601 in the Circuit 2000. The combining of data in accordance with this description is illustrated in FIG. 15. In the illustrative example a "1" in a bit position of the last-look word indicates that the corresponding line was found to be in the "off hook" supervisory state during the preceding scan. A "1" in a bit position of the scanner answer word, however, indicates that the lines scanned are in the "on hook" state. These words, namely, scanner answer word and the last-look word are combined in the Circuit 2000 by the logical function OR and the resulting word is complemented. As shown in the illustrative figure, the resulting service request word comprises a "1" in each bit position wherein a line has experienced a change from the "on hook" to the "off hook" state between successive scans. The resulting word is transmitted via the Bus 2011 and the K Logic Circuitry 3505 to the K Register 4001.

The contents of the K Register 4001 are examined by means of the Detect First "1" Circuit 5415. The Detect First "1" Circuit 5415 generates an output word which identifies the rightmost "1" in the resulting data word and then resets that bit position in the K Register 4001 to the "0" state. Each successive "1" in the resultant data word is thus identified. The identity of the rightmost position is combined with other information available in the Central Control to provide a data word which fully identifies each communication path which is requesting service. This identity comprises the particular position in the ordered group, the identity of the ordered group and the identity of the scanner serving that ordered group. This identity is transmitted under program control to the Buffer Register 2601 for subsequent insertion in a buffer area in the Call Store 103. Subsequently, other program sequences employ this data to provide service for the requesting lines.

A second element of data which may be selectively obtained from the Call Store 103 are the line load control masking words. The line load control masking words are also selectively merged with the scanner answer word and the last-look word to form a modified service request data word. The line load control mask words comprise an ordered set of words wherein "1's" are discretely placed within the words to effect a desired line load control function. At times of extreme traffic overload, a line load control mask word which precludes service to all except certain emergency lines will be employed. In the absence of an overload condition, the line load control word serves no function and does not preclude service to any particular line or group of lines. Between these two extreme conditions service may be rendered on a partial basis and in these conditions a series of line load control mask words are employed during successive intervals of time to provide partial service to successive groups of subscribers.

A line load control mask word comprises a series of "1's" and "0's" in bit position 0 through 15. A "1" occurs in the bit positions to which service is permitted and a "0" in those bit positions to which service is precluded. The combining of the service request word and the line load control mask word by the function of logical AND results in a line load control service request word wherein a "1" occurs in each bit position assigned to a requesting line to which service is permitted.

COMMUNICATION BUSES AND CABLES

Communications between major divisions of this system are by way of bus systems and by way of multiple conductor cables which provide discrete communication paths between selected divisions of the system. The buses and cables are detailed later herein.

Communication within a major division of this system, such as a Central Control 101, may be by way of bus systems; however, such internal bus systems comprise a plurality of single rail parallel paths and are not intended to be covered by the following discussion.

A bus system, as defined herein, comprises a plurality of pairs of conductors. A bus is a transmission means for transferring information from one or more sources to a plurality of destinations. A bus is transformer coupled to both the information source or sources and to the destination loads. The information sources are connected to the bus conductors in parallel and the loads are coupled to transformers which are serially connected in the bus conductors.

Data transmitted over a bus is in pulsed form and in this particular embodiment extremely short pulses in the order of one-half microsecond are transmitted. Information on a bus system is transmitted in parallel, that is, a data word or a command is transmitted in parallel over the plurality of pairs of conductors of the bus and it is important that such parallel data elements arrive at a given load equipment at a common time. Accordingly, the pairs of conductors of a bus system are arranged to follow similar physical paths and their lengths are kept substantially identical.

In addition to the bus systems there are a plurality of multiple conductor cables which provide discrete communication paths between selected divisions of the switching system. The conductor pairs of these cables are in many instances transformer coupled both to the information source and the destination load; however, there are also a number of cables wherein D-C connections are made to both the source and the destination load.

While a bus is a unidirectional transmission means, there are specific instances wherein a cable pair comprises a bidirectional transmission means.

SWITCHING NETWORK (120)

The Switching Network 120 serves to selectively interconnect through metallic paths lines to lines via junctor circuits, lines to trunks, trunks to trunks, lines and trunks to tones, signal transmitters, signal receivers, maintenance circuits, and, in the case of lines, to provide connections to coin supervisory circuits, et cetera. Two-wire paths between the above enumerated equipments are provided through the network of this one specific illustrative embodiment.

The Switching Network 120 only provides communication paths, means for establishing such paths and means for supervising such paths. The Central Processor 100 maintains a record of the busy and idle states of all network links and a record of the make-up of every established or reserved path through the network. These records are maintained in the Call Store 103 of the Central Processor 100. The record relating to the busy-idle states of the network elements is generally referred to as the Network Memory Map. The Central Processor 100 interprets requests for connection between specific pieces of equipment and determines a free path through the network by examining the connection requirements and the above-noted busy-idle states of the possible paths.

The network is divided in two major portions, namely, line link networks which terminate lines and junctors (both wire junctors and junctor circuits) and the trunk link networks which terminate trunks and wire junctors, service circuits such as tone circuits, signal receivers, signal transmitters, et cetera. A line link network comprises four switching stages, the first two stages of which are concentrating stages, while a trunk line network comprises four stages generally without concentration. In this one specific illustrative embodiment there is a single path provided between a line and each of a plurality of line link network junctor terminals. There are four paths through a trunk link network between a trunk terminal and each of a plurality of trunk link network junctor terminals.

Certain junctor terminals of each line link network are connected directly through wire junctors (a pair of wires without other circuit elements) to certain junctor terminals of the trunk link networks; others of the line link network junctor terminals are interconnected either by way of junctor circuits (which provide talking battery and call supervision facilities) or, in very large offices, by way of junctor circuits and additional stages of switching.

Junctor terminals of a trunk link network which are not connected to junctor terminals of a line link network are directly interconnected by wire junctors or, in extremely large offices, by way of wire junctors and additional switching stages.

Control of the network and the control and supervision of the elements connected to the network are distributed through a number of control and supervisory circuits. This disbursement provides an efficient and convenient buffer between the extremely high speed Central Processor 100 and the slower network elements. The principal control and supervisory elements are:

(1) The network control circuits which accept commands from the Central Processor 100 and, in response to such commands, selectively establish portions of a selected path through the network or, in response to such commands, execute particular test or maintenance functions.

(2) The network scanners which comprise a ferrod scanning matrix to which system elements such as lines, trunks and junctor circuits are connected for purposes of observing the supervisory states of the connected elements; the network scanners, in response to commands from the Central Processor 100, transmit to the Central Processor 100 indications of the supervisory states of a selected group of circuit elements.

(3) The network signal distributors which, in response to commands from the Central Processor 100, provide an operate or a release signal on a selected signal distributor output terminal which is termed herein a signal distributor point. A signal of a first polarity is an operate signal and a signal of the opposite polarity is a release signal. Signal distributor output signals are employed to operate or release control relays in junctor circuits, trunk circuits, and service circuits. A magnetically latched wire spring relay is used generally throughout the junctor circuits and trunk circuits for purposes of completing the transmission paths through these elements and for circuit control in general. The magnetically latched relay operates in response to an operate signal (−48 v.) from a signal distributor and releases in response to a release signal (+24 v.) from a signal distributor. The network signal distributors are relatively slow operating devices in that they comprise pluralities of relays. Signal distributor output signals are pulsed signals and a single signal distributor can be addressed to only one of its output points at any given instant.

Of the three above-noted network control and supervisory elements (there are pluralities of each of these) the network controllers and the signal distributors are relatively slow operating devices and to assure completion of a task, each of these devices is addressed at the maximum repetition rate of once every 25 milliseconds. This period of time is sufficient to assure completion of the work function associated with a network controller or signal distributor command. Therefore, there is no need for the Central Processor 100 to monitor these devices to assure completion of their assigned tasks before transmitting a subsequent command to the same controller. However, to assure continued trouble free operation scan points which reflect the successful completion of a preceding order are examined before sending a new command to the controller. The network scanners, however, are relatively fast operating devices and these may be addressed at a maximum rate of once every 11 microseconds.

SUBSCRIBER CIRCUITS

The subscriber sets such as 160, 161 are standard sets such as are employed with present day telephone switching systems. That is, these are sets which connect to the central office via a two-wire line, respond to normal 20 cycle ringing signals and may be arranged to transmit either dial pulses or TOUCH-TONES or may be arranged for manual origination. Subscriber stations comprising one or more subscriber sets such as 160, 161 all terminate at line terminals of a line link network. A subscriber line may have either TOUCH-TONE sets or dial pulse sets or combinations of TOUCH-TONE and dial pulse sets. Information concerning the type of call signaling apparatus associated with a subscriber's line is included in the class of service mark which is maintained normally in the Program Store 102; however, after a recent change this information is found in whole or part in the Call Store 103.

Supervision of a subscriber's line is by way of the line scanners which are located in the vicinity of a line link network. Such scanners, however, are generally employed only to detect requests for service. After a request for service has been served and a subscriber's line has been connected through the network to a trunk or to a service circuit such as a subscriber's dial pulse receiver, subscriber's TOUCH-TONE receiver, a tone source, et cetera, or to another subscriber via a junctor circuit, the scanning element associated with a subscriber's line is disconnected and subsequent supervision for answer and disconnect is transferred either to the trunk, the service circuit, or the junctor circuit. The subscriber's line scanning element is reconnected only after the subscriber's line has been released from the prior connection.

Service circuits such as subscriber call signaling receivers and subscriber information tone sources such as busy tone, ringing tone, ringing induction tone, recorded announcements, vacant level tone, et cetera, are terminated at trunk terminals of the trunk link network. Connections between a subscriber's station and a service circuit such as a dial pulse receiver or a TOUCH-TONE receiver and connections between a subscriber's set and a tone source include the four stages of a line link network and the four stages of a trunk link network.

Communication with a distant office or an operator is by way of two-way trunks, outgoing trunks, incoming trunks, operator trunks, et cetera, which are located in the Trunk Frames 134, 138 and which all terminate at trunk terminals of a trunk link network. In the case of a call between a subscriber's station and a trunk or service circuit, talking battery to the subscriber is provided through the trunk or service circuit and supervision for disconnect is accomplished by scanning the scanning elements of the connected trunk or service circuit.

CENTRAL PULSE DISTRIBUTOR (143)

The Central Pulse Distributor 143 is a high speed electronic translator which provides two classes of output signals in response to commands from the Central Processor 100. The two classes of output signals are termed unipolar signals and bipolar signals and are respectively associated with central pulse distributor output terminals designated CPD unipolar points and CPD bipolar points. Both classes of signals comprise pulses transmitted from the CPD output points to the using devices via individual transmission pairs which are transformer coupled both to the CPD output points and to the load devices.

Central pulse distributors for purposes of reliability are employed in pairs and corresponding bipolar output points of the two central pulse distributors of a pair are employed to address the same circuit element. Similarly, unipolar points are associated in pairs to accomplish related system functions.

The address coding associated with each central pulse distributor is sufficient to define 1,024 CPD points. Of these 1,024 points, 512 are assigned to unipolar points while the other 512 are assigned to 256 pairs of bipolar points.

The most common use of the unipolar signals is to momentarily enable a particular piece of equipment such as a Network Controller 122, a Network Scanner 123, et cetera. The enablement signals comprise relatively important information; therefore, in response to an enablement signal the enabled circuit, shortly after the receipt thereof, transmits a verify signal back to the Central Pulse Distributor 143 over the same pair that was used to transmit the enable signal. The verify signal is received at the Central Pulse Distributor 143 and is translated to the same form as the address portion of the command which was transmitted from the Central Control 101 to the Central Pulse Distributor 143. The translated verify signal is transmitted to the Central Control 101 where it is compared against the address which was transmitted. A match assures enablement of the correct unit of equipment. Not all unipolar output signals represent information which is as important as the enable signals; therefore, certain unipolar signals are not verified.

Both unipolar output signals and bipolar output signals comprise pulses and, as in the case of the signal distributors, only one CPD output point, either unipolar or bipolar, can be enabled at any given instant. Unipolar output signals while generally employed to provide transient gating signals to enable the receiving circuit are also used to set and reset flip-flops in particular instances. Bipolar output signals are employed to both selectively set and reset flip-flops at the receiving circuits. A bipolar signal is accompanied by a "WRMI" security signal when employed to control certain critical circuits. A signal of the first polarity serves to set a flip-flop and a signal of the other polarity serves to reset a flip-flop. The system generally has means for verifying the setting or resetting of a flip-flop in response to CPD bipolar signals; therefore, bipolar signals are not directly verified in the manner employed in the case of unipolar signals.

The Central Pulse Distributor 143 is an electronic device; therefore, its output signals are employed to control other relatively high speed circuits. For example, central pulse distributor output signals are employed to control the sending of both multifrequency signals and dial pulses from a switching center to a distant office via a trunk circuit and central pulse distributor output points are also employed to set or reset control flip-flops in a variety of system equipments. Generally these control flip-flops must be set or reset at speeds which approach a basic system instruction cycle; therefore, the slow speed signal distributor output signals are not adequate.

MASTER SCANNER (144)

The Master Scanner System 144 comprises a ferrod matrix for terminating circuits to be supervised and means for selectively transmitting to Central Control 101 the supervisory states of a selected group of supervised circuits in response to a command from the Central Processor 100. The scanners employed herein are described in greater detail in copending U.S. patent application A. M. Guercio-H. F. May, Ser. No. 250,416, filed Jan. 9, 1963. The scanning element employed is the ferrod device which is disclosed in the copending application of J. A. Baldwin, Jr.- H. F. May, Ser. No. 26,758, filed May 4, 1960. A ferrod comprises an apertured stick of ferromagnetic material having control, interrogate, and readout windings. The control windings are placed in series with electrical connections which indicate the supervisory state of the supervised circuit. For example, where a ferrod is employed to supervise a subscriber's line, the ferrod is placed in series with the line conductors and the subscriber's subset. When the subscriber's subset is in the on-hook state there is no current flowing in the ferrod control winding, while when the subscriber is in the off-hook state current does flow in the ferrod control winding. The interrogate and readout windings merely comprise individual conductors which thread through the two apertures of the ferrod, that is, both the interrogate conductor and the readout conductor are threaded through both apertures of the ferrod. An interrogate signal comprises a bipolar pulse which when applied to the interrogate conductor causes an output signal in the readout conductor of every ferrod which is supervising a circuit which is in the on-hook state. If the ferrod is supervising a circuit in the off-hook state, a readout pulse is not generated due to saturation of the ferrod.

The Master Scanner System 144 comprises one or more scanners each capable of supervising 512 circuits. The scanners of the Master Scanner 144 are not duplicated; however, there is a complete duplication of access circuity within a scanner to provide system reliability. The Master Scanner 144 is generally like the Network Scanners (123, 127, 135, 139) which are distributed through the network frames; however, the Master Scanner 144 is employed to supervise certain circuit elements which reflect the operating state of the system and, therefore, the supervisory states of these elements are helpful in system maintenance and trouble diagnosis. For example, scan points of the Master Scanner 144 are employed to monitor the voltage levels of critical voltage supplies, and the states of control relays and logic packages such as flip-flops to assure proper operation thereof. In addition, the Master Scanner 144 is employed to monitor a few circuits which terminate on the Switching Network 120 and which for efficiency of grouping are more conveniently examined by way of the Master Scanner 144.

LINE SCANNER (123) [FIG. 3]

The following discussion is directed specifically to the Line Scanner 123 which is arranged to supervise 1,024 circuits.

A scanner comprises an unduplicated ferrod matrix and duplicated control and drive circuitry for interrogating the matrix. The Control Circuits 302 serve to accept information from the Network Command Bus System 104, to regulate timing of actions within the scanner and to gate information derived from the Ferrod Matrix 9960 back to the Central Control 101 via the Scanner Answer Bus System 108. The drive circuits are employed to selectively interrogate the rows of the Ferrod Matrix 9960 in accordance with the address information which is received from central control via the Network Command Bus System 104.

In the normal mode of operation information concerning the supervisory state of a particular designated group of sixteen supervised circuits is returned to the central control via the Scanner Answer Bus System 6600.

The scanners are unlike both the Program Store 102 and the Call Store 103 in that each of the scanners is selectively enabled by means of central pulse distributor unipolar output signals on conductor 301.

Enable and command information is transmitted to a scanner in two waves and, similarly, verify and scanner answer information is transmitted from the scanner to Central Control 101 in two waves. An enable signal is received at a scanner and after approximately three-quarters of a microsecond beyond the start of the enable signal the scanner address is received.

The interrogate conductors of the core matrices such as conductors F00 and FR00 are threaded through the interrogate windings of the ferrods of a row. As shown in FIG. 3 the conductor F00 is in series with the interrogate windings of the odd numbered ferrods of the first row, while the conductor FR00 is in series with the interrogate winding of the even numbered ferrods of the first row and the conductors F00 and FR00 are terminated in a resistor and the primary of a transformer such as ASWT-0.

Each row of ferrods of the Matrix 9960 includes a transformer such as ASWT-0 and ASWT-63. A signal is induced in a transformer such as ASWT-0 when the row of ferrods associated therewith is interrogated by a core matrix signal. Signals induced in the secondaries of these transformers are employed as input signals to the OR gate 9961 the output of which comprises a check signal which is transmitted to the Central Control 101.

The output windings of the ferrods of a column are connected in series with each other and in series with a secondary winding of a test transformer such as MT0. These conductors such as R00 and RR00 comprise input signals to the scanner answer AND gates in the Scanner Control 302.

The scanner responses which result from the interrogation of the ferrods of the Matrix 9960 are transmitted through these AND gates to the Central Control 101.

CENTRAL PROCESSOR (100)

The Central Processor 100 is a centralized data processing facility which comprises:

(1) Program Store 102;
(2) Call Store 103;
(3) Central Control 101.

Program Store (102)

The Program Store of the Central Processor comprises a plurality of indepedent memory units which are passive in the absence of commands from the Central Control.

In the illustrative embodiment, the Program Store is a permanent magnet-magnetic wire memory (Twistor) which affords nondestructive readout of the information stored therein in response to response to commands from the Central Control 101. The Program Store, being semi-permanent in nature, is employed to store certain system data, which is changed only at relatively long intervals, and the system programs. Information is written into the Program Store by means of the Program Store Card Writer 146 (FIG. 1) under commands from the Central Control 101.

Call Store (103)

The Call Store of the Central Processor comprises a plurality of independent memory units.

The Call Store, like the Program Store, is passive in the absence of commands from the Central Control.

In the illustrative embodiment, a word organized ferrite sheet memory is employed as the memory element of the Call Store 103. The Call Store is a destructive readout type memory and information may be read from or written into this memory in a time cycle which corresponds to the time cycle of the Central Control 101. The Call Store, being temporary in nature, is employed to store the system data which is subject to rapid change in the course of processing calls through the system.

CENTRAL CONTROL (101) [FIGS. 4-6]

The Central Control 101, which is shown in FIGS. 4-6 is the system data processing unit. For the purpose of discussion the Central Control 101 may be divided into two basic parts:

(1) Basic data processing facilities;
(2) Facilities for communicating with central control input sources and output devices.

The central control performs system data processing functions in accordance with program orders which are stored principally in the Program Store 102. In a few specialized instances program orders are found in the Call Store 103. The program orders are arranged within the memories in ordered sequences. The program orders fall into two general classifications, namely, decision orders and nondecision orders.

Decision orders are generally employed to institute desired actions in response to changing conditions either with regard to lines or trunks served by the switching system or changing conditions with respect to the maintenance of the system.

Decision orders dictate that a decision shall be made in accordance with certain observed conditions and the result of the decision causes central control to advance to the next order of the current sequence of order words or to transfer to an order in another sequence of order words. The decision to transfer to another sequence may be coupled with a further determination that the transfer shall be made to a particular one of a plurality of sequences. Decision orders are also termed conditional transfer orders.

Nondecision orders are employed to communicate with units external to Central Control 101 and to both move data from one location to another and to logically process the data. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 101 is arranged to perform certain minor arithmetic functions. The arithmetic functions are generally not concerned with the processing of data but, rather, are primarily employed in the process of fetching new data from the memories such as from the Program Store 102, the Call Store 103, or particular flip-flop registers within the Central Control 101.

The Central Control 101, in response to the order word sequences, processes data and generates and transmits signals for the control of other system units. The control signals which are called commands are selectively transmitted to the Program Store 102, the Call Store 103, the Central Pulse Distributor 143, the Master Scanner 144, the network units such as the Network Scanners 123, 127, 135, 139, Network Controllers 122, 131, Network Signal Distributors 128, 136, 140, and the miscellaneous units such as the Teletype Unit 145, the Program Store Card Writer 146, and the AMA Unit 147.

The Central Control 101 [FIGS. 4-6] is, as its name implies, a centralized unit for controlling all of the other units of the system. A Central Control 101 principally comprises:

(A) A plurality of multistage flip-flop registers;
(B) A plurality of decoding circuits;
(C) A plurality of private bus systems for communicating between various elements of the central control;
(D) A plurality of receiving circuits for accepting input information from a plurality of sources;
(E) A plurality of transmitting circuits for transmitting commands and other control signals;
(F) A plurality of sequence circuits;
(G) Clock sources; and
(H) A plurality of gating circuits for combining timing pulses with D-C conditions derived within the system.

The Central Control 101 is a synchronous system in the sense that the functions within the Central Control 101 are under the control of a multiphase Microsecond Clock 6100 which provides timing signals for performing all of the logical functions within the system. The timing signals which are derived from the Clock 6100, 6101 are combined with D-C signals from a number of sources in the Order Combining Gate Circuit 3901. The details of the Order Combining Gate Circuit 3901 are not shown in the drawing as the mass of this detail would merely tend to obscure the inventive concepts of this system.

Sequence of Central Control Operations

All of the system functions are accomplished by execution of the sequences of orders which are obtained from the Program Store 102 or the Call Store 103. Each order of a sequence directs Central Control 101 to perform one operational step. An operational step may include several logical operations as set forth above, a decision where specified, and the generation and transmission of commands to other system units.

The Central Control 101 at the times specified by phases of the Microsecond Clock 6100 [FIG. 5] performs the operational step actions specified by an order. Some of these operational step actions occur simultaneously within Central Control 101, while others are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into one-half microsecond periods which are initiated at one-quarter microsecond intervals.

The basic machine cycle for purposes of designating time is divided into one-quarter microsecond intervals, and the beginning instants of these intervals are labeled T0 through T22. The major phases are labeled phase 1, phase 2, and phase 3. These phases occur in a 5.5 microsecond machine cycle as follows:

(A) Phase 1—T0 to T8,
(B) Phase 2—T10 to T16,
(C) Phase 3—T16 to T22.

Figure 7:
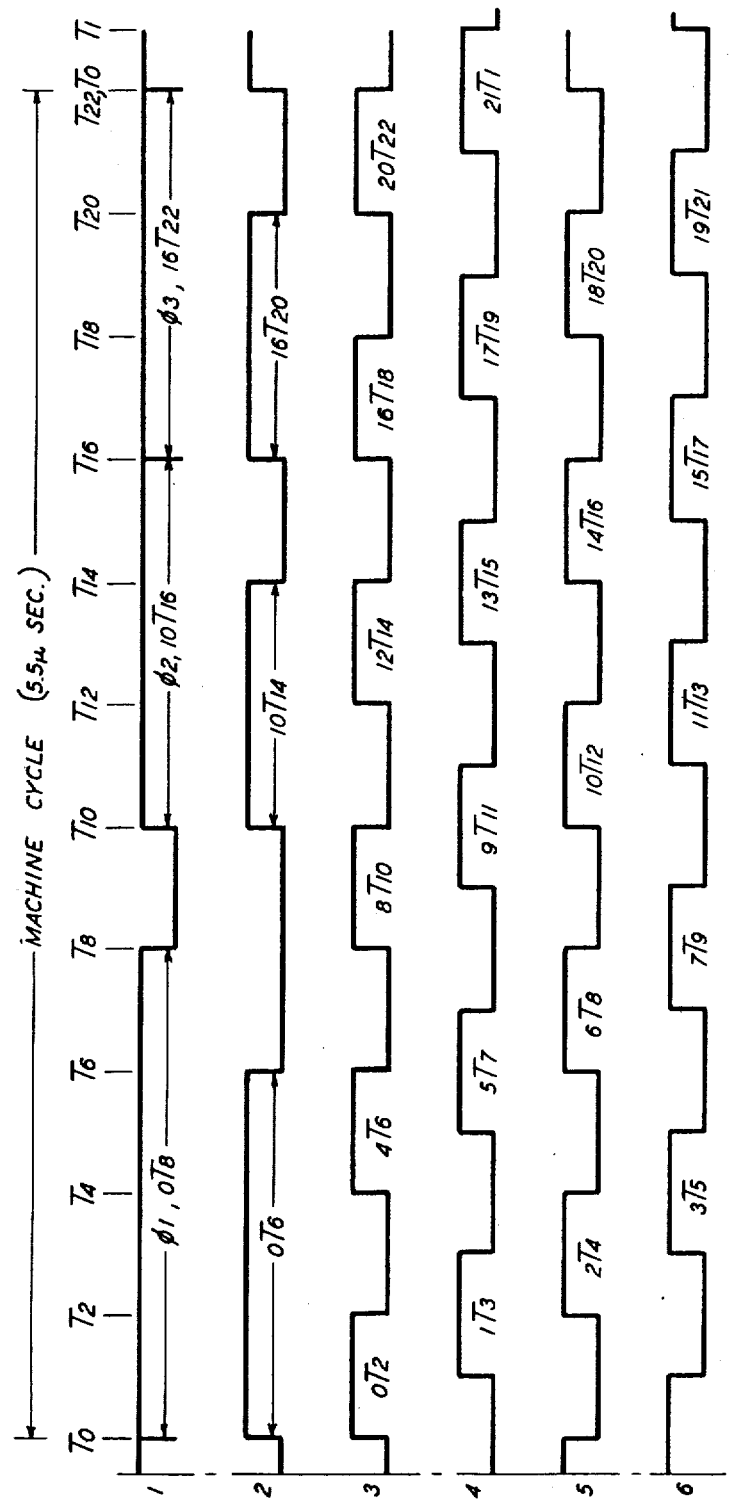
FIG. 7 is a time diagram showing the fundamental pulses employed in the control arrangement of FIGS. 4, 5 and 6.

For convenience in both the following description and in the drawing, periods of time are designated $bTe$ where $b$ is the number assigned the instant at which a period of time begins and *e* the number assigned the instant at which a period of time is ended. For example, the statement 10T16 defines phase 2 which begins at time 10 and ends at time 16. The division of time is shown in FIG. 7.

In order to maximize the data processing capacity of Central Control 101 three cycle overlap operation is employed. In this mode of operation central control simultaneously performs:

(A) The operational step for one instruction;

(B) Receives from the Program Store 102 the order for the next operational step; and (C) Sends an address to the Program Store 102 for the next succeeding order.

Figure 8:
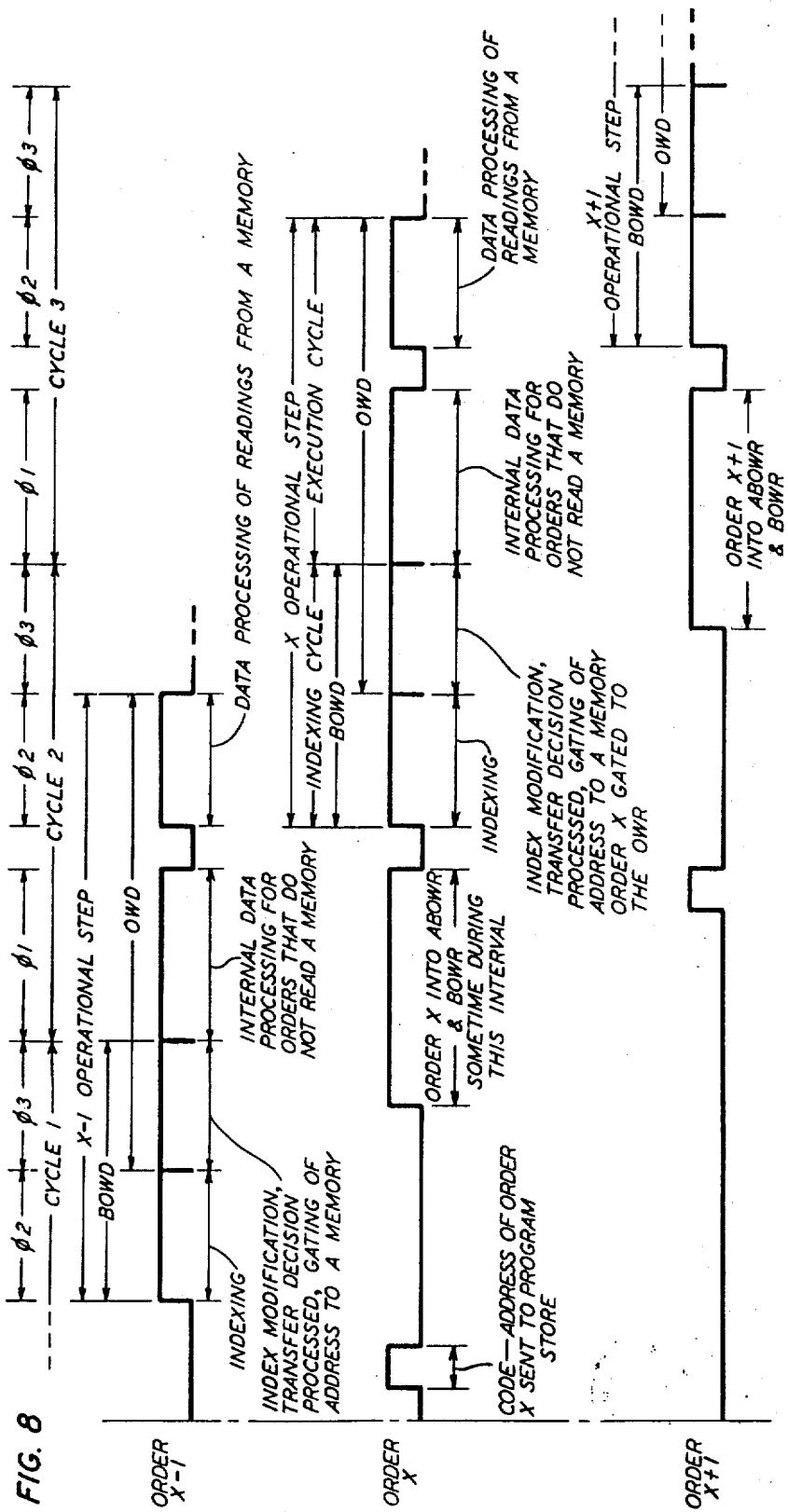
FIG. 8 is a time diagram which illustrates the processing of three successive program order words.
Figure 9:
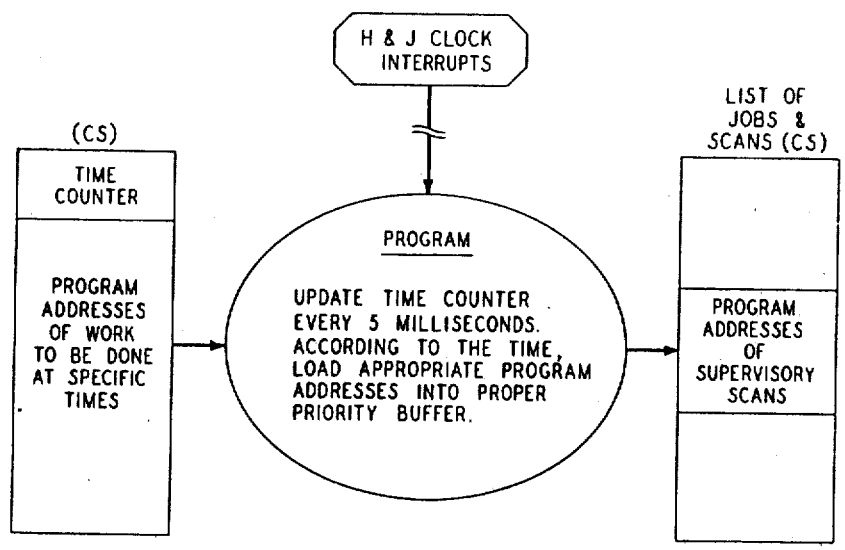
FIG. 9 shows control functions of the system.
Figure 9A:
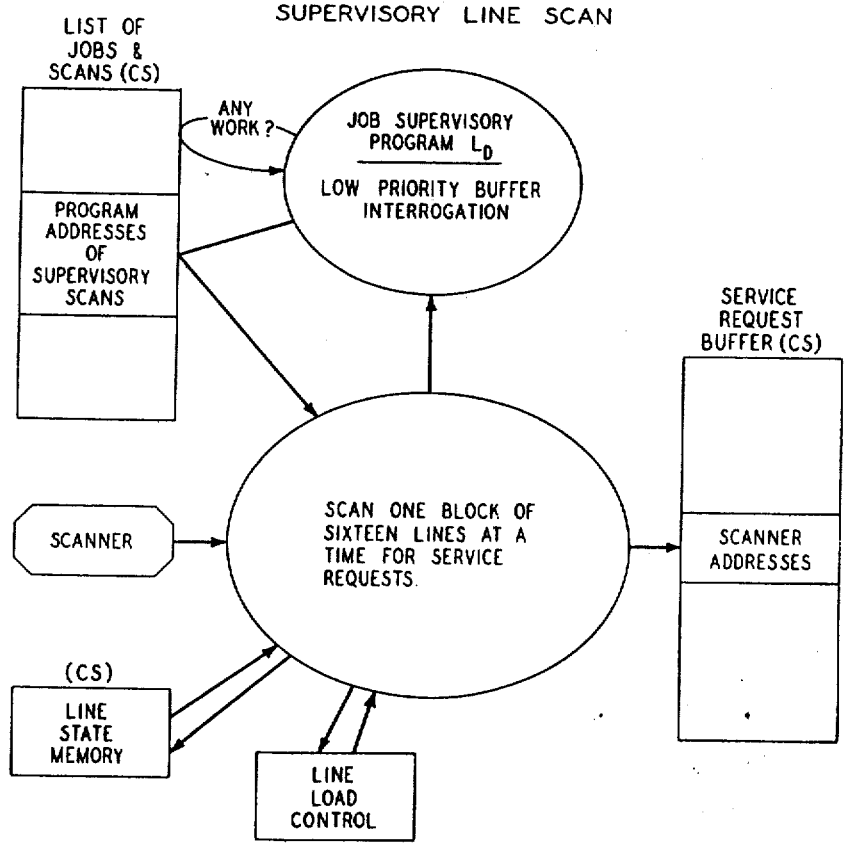

This mode of operation is illustrated in FIG. 8. Three cycle overlap operation is made possible by the provision of both a Buffer Order Word Register 2410, an Order Word Register 3403 and their respective decoders, the Buffer Order Word Decoder 3902 and the Order Word Decoder 3904. A Mixed Decoder 3903 resolves conflicts between the program words in the Order Word Register 3403 and the Buffer Order Word Register 2410. The Auxiliary Buffer Order Word Register 1901 absorbs differences in time of program store response.

The initial gating action signals for the order X (herein designated the indexing cycle) are derived in the Buffer Order Word Decoder 3902 in response to the appearance of order X in the Buffer Order Word Register 2410. The order X is gated to the Order Word Register 3403 (while still being retained in the Buffer Order Word Register 2410 for the indexing cycle) during phase 3 of cycle 2; upon reaching the Order Word Register 3403 the final gating actions (herein indicated as the execution cycle) for the order X are controlled via Order Word Decoder 3904.

The indexing cycle and the execution cycle are each less than a 5.5 microsecond machine cycle in duration. In the executing of the operational steps of a sequence of orders like those shown in FIG. 8 each order remains in the Order Word Register 3403 and the Buffer Order Word Register 2410 each for one 5.5 microsecond cycle. The Buffer Order Word Decoder 3902 and the Order Word Decoder 3904 are D-C combinational circuits; the D-C output signals of the decoders are combined with selected microsecond clock pulses (among those indicated in FIG. 7) in the Order Combining Gate Circuit 3901. This Order Combining Gate Circuit 3901 thus generates the proper sequences of gating signals to carry out the indexing cycle and the execution cycle of each of the sequence of orders in turn as they appear first in the Buffer Order Word Register 2410 and then in the Order Word Register 3403.

The performance of the operational steps for certain orders requires more time than one operational step period, i.e., more than 5.5 microseconds. This requirement for additional time may be specified directly by the order; however, in other instances this requirement for additional time is imposed by indicated trouble conditions which occur during the execution of an order. Where an order specifies that the execution thereof will require more than one operational step period, the additional processing time for that order may be gained by:

(1) Performing the additional data processing during and immediately following the indexing cycle of the order and before the execution cycle of the order; or (2) Performing the additional data processing during and immediately after the normal execution cycle of the order.

The performance of these additional work functions is accomplished by way of a plurality of sequence circuits within Central Control 101. These sequence circuits are hardware configurations which are activated by associated program orders or trouble indications and which serve to extend the time in the operational step beyond the normal operational step period illustrated in FIG. 8. The period of time by which the normal operational step period is extended varies depending upon the amount of additional time required and is not necessarily an integral number of machine cycles. However, the sequences which cause delays in the execution of other orders always cause delays which are an integral number of machine cycles.

The sequence circuits share control of data processing within the Central Control 101 with the decoders, i.e., the Buffer Order Word Decoder 3902, the Order Word Decoder 3904, and the Mixed Decoder 3903. In the case of orders in which the additional work functions are performed before the beginning of the execution cycle, the sequence circuit, or as more commonly referred to, the "sequencer" controls the Central Control 101 to the exclusion of decoders 3902, 3903, and 3904. However, in the case of orders in which the additional work functions are performed during and immediately after the execution cycle of the order, the sequencer and the decoders jointly and simultaneously share control of the Central Control 101. In this latter case there are a number of limitations placed on the orders which follow an order which requires the enablement of a sequencer. Such limitations assure that the central control elements which are under the control of the sequencer are not simultaneously under control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within Central Control 101 and with selected clock pulses in the Order Combining Gate Circuit 3901 to generate gating signals. These signals carry out the required sequence circuit gating actions and cause the counter circuit to advance through its sequence of internal states.

Sequence circuits which extend the period of an operational step by seizing control of a Central Control 101 to the exclusion of the decoders 3902, 3903 and 3904 are arranged to transmit the address of the next succeeding program order word concurrently with the completion of the sequencer gating actions. Thus, although the execution of the order immediately succeeding an order which enabled the sequencer of the above character is delayed, the degree of overlap shown in FIG. 8 is maintained.

Sequence circuits which do not exclude the decoders 3902, 3903 and 3904 provide additional overlap beyond that shown in FIG. 8. That is, the transmission of the address of and acceptance of the order immediately succeeding an order, which enabled a sequencer, are not delayed. The additional gating actions required by such sequence circuits are carried out not only concurrently with the indexing cycle of the immediately succeeding order, but also concurrently with at least a portion of the execution cycle of the immediately succeeding order.

A few examples will serve to illustrate the utility of the sequence circuits. A program order which is employed to read data from the Program Store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

When errors occur in the reading of words from the Program Store 102, the Program Store Correct-Reread Sequencer 5301 is enabled to effect a correction or a rereading of the Program Store 102 at the previously addressed location. This sequence circuit is representative of the type of sequence circuit which is enabled by a trouble indication and which seizes control of the Central Control 101 to the exclusion of the decoders.

The Command Order Sequencer 4902 which serves to transmit network commands to the Switching Network 120 and to the miscellaneous network units, i.e., Master Scanner 144, AMA Tape Unit 147, and Card Writer 146, is representative of the sequence circuits which, when enabled, increase the degree of overlap beyond that shown in FIG. 8. That is, the transmission of network commands extends into the execution cycle of the order following the network command order.

In the processing of certain multicycle orders a plurality of sequence circuits may be activated so that the processing of the multicycle order may include both kinds of gating actions; first additional gating cycles may be inserted between the indexing cycle and the execution cycle of the order, and then a second sequence circuit may be activated to carry out gating actions which extend the degree of overlap to an additional cycle or cycles.

Central Control Responses to Program Order Words

FIGS. 4-6, a block diagram of the Central Control 101, aid in understanding the basic operational step actions that are performed by Central Control 101 in response to various program order words. Each program order word comprises an operational field, a data-address field, and Hamming error detecting and correcting bits.

The operation field is a fourteen or a sixteen bit binary word which defines the order and specifies the operational step actions to be performed by the Central Control 101 in response to the order. The operation field is fourteen or sixteen bits long, depending on the particular order which is defined by the operation field.

There are sets of "options" that may be specified with each of the program order words. The operational step of each order consists of a specific set of gating actions to process data contained in Central Control 101 and/or communicate information between the Central Control 101 and other units in our system. When an option is specified with the program order being executed, additional data processing is included in the operational step. Accordingly, a portion of the fourteen or sixteen bit operation field of a program order word specifies the program order, and the remaining portion of the field may select one or more of the options to be executed.

Certain of the options are compatible with and provide additional data processing for nearly all of the orders. An example of such an option is that of "indexing" in which none or one of seven flip-flop registers within Central Control 101 are selected for additional data processing. In the orders which permit indexing a three bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, Central Control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability. This conditional assignment advantageously permits the inclusion of a larger variety of orders and options than could otherwise be included in the fourteen to sixteen bit operation field.

The data-address field of a program order word is either a twenty-three bit data word to be placed in a selected flip-flop register in Central Control 101 or a twenty-one bit word which may be used directly or with indexing to form a code-address for addressing memory.

In all order words the sum of the bits of the operation field (sixteen or fourteen) plus the bits of the data-address field twenty-one or twenty-three is always thirty-seven bits. If the order word has a sixteen bit operation field, its data-address field will be twenty-one bits long; if the operation field is fourteen bits long, the data-address is a twenty-three bit number. The shortened D-A field is utilized to obtain more combinations in the correspondingly lengthened operation field and therefore a larger and more powerful collection of program order words.

The Central Control 101 performs the operational steps for most orders at the rate of one order per 5.5 microsecond cycle. Although such orders are designated single cycle orders, the total time involved in obtaining the order word and the central control responses thereto is in the order of three 5.5 microsecond cycles. The overlap operation previously noted herein permits Central Control 101 to achieve the stated rate of performing one such single cycle order every 5.5 microseconds.

The sequence of gating actions for a typical order, order X, and their relationship to the gating actions for the preceding order, order $X-1$, and a succeeding order, order $X+1$, are shown in FIG. 8. As shown on line 2 of FIG. 8, during phase 1 of a 5.5 microsecond cycle that is arbitrarily designated cycle 1, the code and address of program order word X appears in the Program Address Register 4801 (PAR) and is gated to the Program Store 102 via the Program Store Address Bus 6400. The code and address is interpreted by the Program Store 102 and the order word X is returned to central control over the Program Store Response Bus 6500 sometime during phase 3 of cycle 1 or phase 1 of cycle 2. The operation field portion of the program order word is gated into the Auxiliary Buffer Order Word Register 1901, and the data-address field, and the Hamming bits of the order word are gated into the Buffer Order Word Register 2410.

The operation field is first gated into the Auxiliary Buffer Order Word Register 1901 since it is possible that the program order word which is returned from the Program Store 102 reaches Central Control 101 prior to completion of the gating actions by the Buffer Order Word Decoder 3902 on the preceding order word, in this case order word $X-1$. This may be seen by reference to FIG. 8 where in the line labeled $X-1$, the gating directed by the Buffer Order Word Decoder 3902 for the order word $X-1$ is completed at the end of phase 3 of cycle 1; and, as shown in the line labeled X, the program order word X may reach central control in the latter portion of phase 3 of cycle 1. The Auxiliary Buffer Order Word Register 1901 resolves this conflict. The same situation does not obtain with respect to either the Hamming encoding bits or the data-address word as by the end of phase 2 of cycle 1 all of the actions with respect to both the Hamming encoding bits and the data-address bits for the order $X-1$ have been completed.

The time at which a program order word reaches the Central Control 101 is subject to variation as a result of a number of factors. For example, since there are two central controls and a number of program stores, the physical distance between a particular central control and each of the program stores is different and this difference is reflected in both the Program Store Address Bus 6400 and in the Program Store Response Bus 6500. Further, there may be differences in the response times of the various program stores and their access circuits and these variations may be cumulative with the differences in bus lengths.

The decoded outputs of the Buffer Order Word Decoder 3902 are combined with selected clock pulses from the Microsecond Clock 6100 in the Order Combining Gate Circuit 3901 which operates selected gates within Central Control 101 in the proper time sequence during phase 2 and phase 3 of the second cycle to perform indexing, index modification, and certain other gating actions with respect to order X.

During phase 3 of the second cycle the operation field of order X (FIG. 8) is gated from the Buffer Order Word Register 2410 to the Order Word Register 3403. The Order Word Decoder 3904 decodes the operation field of the order X which is in the Order Word Register 3403 for the performance of the remaining gating actions. D-C output signals from the Order Word Decoder 3904 are combined with selected pulses from the Microsecond Clock 6100 in the Order Combining Gate 3901 to complete the gating actions of the single cycle order X during phase 1 and phase 2 of the third cycle.

During phase 2 of the third cycle order X is completing its last gating action from the Order Word Register 3403 and the Order Word Decoder 3904 and order X+1 is simultaneously performing the indexing step from the Buffer Order Word Register 2410 and the Buffer Order Word Decoder 3902. Since the simultaneous gating actions may conflict in the use of the flip-flop registers such as XR, YR, ZR, et cetera, the Mixed Decoder 3903 decodes the contents of both the Buffer Order Word Register 2410 and the Order Word Register 3403. The Mixed Decoder 3903 outputs, which are D-C signals, are combined with the outputs of the Buffer Order Word Decoder 3902 in the Order Combining Gates 3901 to modify gating actions so as to resolve conflicts in the two operational steps.

A conflict which is resolved by the Mixed Decoder 3903 occurs when a first order specifies a particular one of the index registers as the destination register for a memory word obtained by the execution of that order while the immediately succeeding order specifies that the contents of that same index register be employed in indexing. In the performance of indexing, the contents of the specified index register are normally gated from the output of the specified index register to the Unmasked Bus 2014 and from there via AND gate 2914 to the Augend Register 2908 of the Index Adder arrangement. However, where successive orders specify the same index register as a destination register for memory reading and as a source register, there is insufficient time to complete the transfer of the information to the destination register; therefore, the Mixed Decoder 3903 in these instances transfers the desired information from the Masked Bus 2011 via AND gate 2913 directly to the Augend Register 2908 at the same time that this information is being transmitted to the specified destination index register.

Mask and Complement Circuit 2000 (M&C)

The internal data processing structure is built around two multiconductor buses, the Unmasked Bus 2014 and the Masked Bus 2011, which provide a link for moving a multibit word of data from one of a specific group of flip-flop registers to another. This group consists of the Index Registers 2601 (BR), 5801 (FR), 5802 (JR), 4001 (KR), 2501 (XR), 3001 (YR), and 3002 (ZR) and the Logic Register 2508 (LR).

The mask and Complement Circuit 2000 (M&C) connects the Unmasked Bus 2014 to the Masked Bus 2011 and provides means for logically operating upon the data as it passes from the Unmasked Bus 2014 to the Masked Bus 2011. The logical operation to be performed, product masking (AND), union masking (OR), exclusive OR masking (EXCLUSIVE-OR), and complementing is prescribed by the operation field of the program order as decoded by either the Buffer Order Word Decoder 3902 or the Order Word Decoder 3903. Only one masking operation may be performed in a single pass of data through the circuit M&C; however, the masking operation may be followed by a complementing operation in gating data through the circuit M&C. Each of the masking operations requires two operands and the contents of the Logic Register LR always comprises one of the operands.

The Mask and Complement Circuit M&C (2000) also provides a convenient means for connecting the Data Buffer Register 2601 and the Index Adder Output Register 3401 to the Masked Bus 2011. The data word which appears at one of the input AND gates of the Mask and Completment Circuit 2000 may be selectively gated directly to the Masked Bus 2011 without alteration or may be masked and/or complemented during transmission through the mask and complement circuit. The AND-OR Circuit of the Mask and Complement arrangement 2000 serves to "Union" mask or "Product" mask the input data word when enabled by order cable signals on conductors 20UMASK and 20PMASK, respectively. The word appearing at the output of the AND-OR Circuit may be complemented in the Complement Circuit 2006 of the Mask and Complement Arrangement 2000 by enabling order cable conductor 20COMP or may be transmitted directly to the Masked Bus 2011 by enabling order cable conductor 20MPASS.

The input data word may be gated directly to the Masked Bus 2011 by enabling order cable on conductor 20PASS or may be complemented by enabling order cable conductor 20COMP.

Exclusive OR masking may be achieved by enabling order cable conductor 20XMASK.

K Register 4001 (KR); K Logic (KLOG);
Detect First-One Circuit 5415 (DFO)

The K Register KR, the K Logic KLOG, and the Detect First-One Circuit 5415 (DFO) provide a second major internal data processing facility. The K Logic KLOG comprises input and output circuitry surrounding the K Register 4001. The K Logic KLOG includes the K A Input Register 3502, the K B Input Register 3504, the K Input Logic 3505, the K Logic Homogeneity Circuit 4502; and at the output of the K Register 4001 the Rotate Shift Circuit 4500 and the K Register Homogeneity Circuit 4503. The K Logic 3505 may be directed by output signals of the Order Combining Gate OCG (3901) to perform one of four logical operations on two operands. One operand is the content of the K Register KR; the other is the information on the Masked Bus 2011. The Order Word Decoder OWD and the K Register Sequence Circuit (one of the sequence circuits SEQ1–SEQN of FIG. 5) generate signals which cause the K Logic 3505 (KLOG) to combine the two operands in the operations of AND, OR, EXCLUSIVE-OR, or ADDITION. The word resulting from the logical combination, according to the order in the Order Word Register OWR, may either be gated to the K Register 4001 (KR) or to the Control Homogeneity Circuit 5000 and the Control Sign Circuit 5413 (CS).

A word appearing on the Masked Bus 2011 (MB) may in some instances be gated directly to the K Register 4001 (KR) via the K Logic 3505 (KLOG). The K Register KR may thereby be employed as a simple destination register for data like other flip-flop registers in central control such as XR, YR, ZR, et cetera.

In carrying out the ADDITION operation in the K Logic 3505 (KLOG) the two operands are treated as twenty-two bit signed numbers. The twenty-third bit of each operand is the sign bit. If this bit has the value "0" the number is positive, and the magnitude of the number is given by the remaining twenty-two bits. If the sign bit is "1" the number is negative, and the magnitude of the number is given by the one's complement of the remaining twenty-two bits. (The magnitude is determined by inverting each bit of the twenty-two bit number.) The add circuit within K Logic 3505 (KLOG) can correctly add any combination of positive and negative operands as long as long as the magnitude of the algebraic sum of the two operands is equal to or less than $2^{22}-1$.

The K Logic 3505 (KLOG) and the K Register 4001 (KR) can perform other logical operations on the contents of the K Register 4001 (KR). One of these operations is given the name "SHIFT." The gating action performed by SHIFT is based, in part, on the least significant six bits of the number that appears in the Index Adder 3401 (IA) at the time the shift is to be performed. The least significant five bits constitute a number that indicates the magnitude of the shift, and the sixth bit determines the direction of the shift. A "0" in the sixth bit is interpreted as a shift to the left, and the remaining five bits indicate the magnitude of this shift. A "1" in the sixth bit is interpreted as a shift to the right, and the one's complement of the remaining five bits indicates the magnitude of the shift to the right. Although in shifts to the right the least significant five bits contain the one's complement of the magnitude of the shift, the six bit number will be referred to hereafter as comprising a sign and a magnitude.

A logical operation similar to the shift is the operation "ROTATE." As in shifting, the six bits of the Index Adder 3401 (IA) are treated as a direction and magnitude for the rotation just as described for the shift.

A rotate of one to the left is identical to a shift of one to the left except for the gating of the flip-flops at each end of the K Register 4001. In a rotation of one to the left the content of bit twenty-two is not lost as in the shift but instead replaces the content of the least significant zero bit of the K Register 4001. A rotate of two to the left is identical to two rotates of one to the left in succession, a rotate of three to the left is identical to three rotates of one to the left, et cetera. A rotate of twenty-three to the left has the same effect on the K Register 4001 as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K Register 4001.

Another logical gating action is the determination of the rightmost one in the contents of the K Register 4001. This action is accomplished by gating the contents of the Detect First-One Circuit DFO to the F Register 5801 (FR) via the Unmasked Bus 2014 (UB), the Mask and Complement Circuit 2000 (M&C), and the Masked Bus MB. The number gated is a five bit binary number corresponding to the first stage (reading from the right) in the K Register 4001 which contains a "1." If the least significant bit of the K Register 4001 contains a "1," zero is the number gated to the F Register 5801. If the first "1" reading from the right is in the next position, one is the number gated to the F Register 5801. If the only "1" appearing in the K Register 4001 is in the most significant position, twenty-two is the number gated to the F Register 5801. If the K register contains no "1's," then nothing is gated to the F Register.

Index Adder (IA)

A third major data processing configuration within the Central Control 101 is the Index Adder 2904, 2908, 3407, 3401 IA which is used to:

(1) Form a quantity designated herein as the indexed DAR word consisting of the sum of the D-A field of the program order word being executed and the contents of an index register specified in an order, or (2) To perform the task of a general purpose adder; the operands in this latter instance may be the contents of two index registers or the D-A field and the contents of an index register.

The Index Adder arrangement comprises an Addend Register 2904, an Augend Register 2908, a Parallel Adder 3407 and an Index Adder Output Register 3401. The output signals of the Index Adder (IA) are selectively connected to the Program Address Register (PAR), the Memory Address Decoder 3905 (MAD), and the Call Store Address Bus System 6401 when employed for indexing; the outputs of the adder may also be connected to the Masked Bus 2011 (MB) via the Mask and Complement Circuit 2000 (M&C) when employed as a general purpose adder. Access to the Masked Bus 2011 (MB) permits the word formed to be employed for a number of purposes, for example:

(1) Data to be placed in the K Register 4001 (KR) without modification or to be combined with the contents of the K Register 4001 (KR) in the K Logic 3505 (KLOG);

(2) A number for determining the magnitude and direction of a shift or rotate;

(3) Data to be placed in a specified index register;

(4) Data to be transmitted over the Network Command Bus 6406 via the K A Input Register 3502 and the Command Translator 3509;

(5) Data to be sent to the Central Pulse Distributor 143 via the F Register 5801 (FR) and the Central Pulse Distributor Translator CPD–T.

Indexing is the adding of two numbers in the Index Adder 3407 (IA). The D-A field of the order as it appears in the Buffer Order Word Register 2410 (BOWR) is one operand used in indexing and the other operand, if required, is the contents of one of the seven Index Registers BR, FR, JR, KR, XR, YR, and ZR. For orders which include the indexing option a three bit number within the operation field specifies either (1) no indexing, or (2) indexing on one of the seven flip-flop registers according to the following table.

| X34 | X33 | X32 | Register |
|---|---|---|---|
| 0 | 0 | 0 | (1) |
| 0 | 0 | 1 | BR |
| 0 | 1 | 0 | FR |
| 0 | 1 | 1 | JR |
| 1 | 0 | 0 | KR |
| 1 | 0 | 1 | XR |
| 1 | 1 | 0 | YR |
| 1 | 1 | 1 | ZR |

[1] No register.

If no register is specified for indexing, then only the D-A field is gated to the Index Adder arrangement (IA) and the output of the Index Adder arrangement (IA) will be the D-A field (the sum of the D-A field and zero). If an index register is specified, the contents thereof are normally gated onto the Unmasked Bus 2014 (UB) and from there directly into the Index Adder arrangement (IA).

If the order X [FIG. 8] specifies indexing, and if the index constant is obtained by a memory reading operation of the preceding order X—1, then the Mixed Decoder 3903 (MXD) substitutes the Masked Bus 2011 (MB) for the index register. The Mixed Decoder 3903 (MXD) insures that the Index Adder arrangement (IA) always has the correct operands to perform the timely addition to complete the operational step for order X.

A number of the orders have as an option specified by a combinations of bits in the operation field the loading of the D-A field into the Logic Register 2508 (LR). This option permits the placing of specified new data into the Logic Register 2508 (LR) for use in subsequent masking operations. If the D-A field is used to load the Logic Register 2508 (LR), then it is considered not available for indexing and the only operand gated to the Index Adder arrangement (IA) is the contents of a specified index register.

The sum appearing at the output of the Index Adder arrangement (IA) is referred to as the DAR address or word. If indexing is not specified in an order, the DAR address or word is the D-A field of that order. If indexing is specified and the D-A field is not gated to the Logic Register 2508 (LR), the DAR address or word will be the sum of the D-A field and the contents of the specified index register. If the D-A field is used for loading the Logic Register 2508 (LR), the DAR will be the contents of the specified index register.

The Index Adder arrangement 2704, 2908, 3407, 3401 (IA), as well as the add circuit within the K Logic 3505 (KLOG), utilizes one's complement binary arithmetic.

All inputs of the index adder are treated as twenty-two bit numbers with the twenty-third bit a sign bit. A positive number is indicated by a "0" in the twenty-third bit and a negative number by a "1" in the twenty-third bit. End-around-carry is provided so that the Index Adder arrangement (IA) can correctly handle all four combinations of positive and negative operands as long as the algebraic sum of the two operands does not exceed $2^{22}-1$.

Some orders, as previously mentioned, have a twenty-three bit D-A field, and others have a twenty-one bit D-A field. If the D-A field is only twenty-one bits long, then the twenty-first bit is treated as the sign bit; this bit is expanded to also become the twenty-second and twenty-third bits of the effective D-A field gated to the Index Adder arrangement (IA). Expansion converts a twenty-one bit D-A field to an effective twenty-three bit D-A field for indexing. Expansion preserves the end-around-carry for indexing with twenty-one bit D-A fields.

Decision Logic 3906 (DEC)

The Central Control 101 in the execution of a decision order in a sequence of orders either continues with the current sequence of orders or transfers to a new sequence of orders. The decision is made by the Decision Logic 3906 (DEC) in accordance with the order being processed. The order specifies the information to be examined and the basis for the decision. The information may be obtained from the Control Homogeneity Flip-Flop 5020, the Control Sign Flip-Flop 5413 or selected outputs of the K Logic 3505 KLOG. The basis of the decision may be that the information examined is (or is not) arithmetic zero, less than zero, greater than zero, et cetera. A decision to advance does not disturb the current sequence of obtaining and executing orders. A decision to transfer to a new sequence of orders is coupled in accordance with the particular word being executed to a determination of whether the transfer is an "early transfer" or a "late transfer." Accordingly, if the decision is made to transfer, either the early transfer conductor ETR or the late transfer conductor LTR will be energized and thereby activate the Transfer Sequencer 4401. Transfer signals from these conductors lead to the gating of the transfer address to the Program Address Register 4801 PAR. This causes the next program order word to be obtained from a new sequence of order words. The transfer address may be obtained from a number of sources and the source is indicated by the order being executed. In the case of "early transfer" orders, the transfer address comprises the contents of a preselected one of the J Register 5802 (JR) or the Z Register 3002 (ZR). In the case of "late transfer" orders the transfer address may be obtained directly, in which case the DAR code-address which is formed in the index adder is employed, or indirectly, in which case the transfer address comprises a memory reading at the location specified by the DAR code-address which is formed in the Index Adder arrangement (IA). This latter case is referred to herein as indirect addressing.

The distinction between "early transfer" and "late transfer" orders is based on whether or not the decision order requires a memory reading or writing in the event of an advance. A decision order which requires a memory to be read or written into after a decision to advance is an "early transfer" order. If the decision on such an early transfer order is to advance, then the memory reading or writing operation is carried out as a normal gating action under control of the Buffer Order Word Decoder 3902 (BOWD) and the Order Word Decoder 3904 (OWD). However, if the decision is to transfer, the decision is advantageously made "early" to inhibit the gating associated with the memory reading or writing operation.

Other transfer orders which do not require a memory reading operation but which do require extensive data processing prior to making the decision are termed "late transfer" orders. These orders cannot employ the early transfer timing sequence in that the data processing operations required thereby are not necessarily completed by the time the early transfer signal would be generated.

Two input information sources for the decision logic comprise the output signals of the control homogeneity flip-flop 5020 and the control signal flip-flop 5413 which are employed to register homogeneity and sign information which is obtained from a number of locations. For example, a twenty-three bit data word appearing on the Masked Bus 2011 (MB) may be transmitted to the Control Homogeneity Circuit 5000 (CH). If the data word comprises either all "0's" or all "1's," the Control Homogeneity Flip-Flop 5020 will be set to its "1" state, otherwise the flip-flop will be reset. The Control Sign Flip-Flop 5413 serves to retain the sign of the data word; the Control Sign Flip-Flop 5413 is set if the word is negative and is reset if the word is positive.

The Control Homogeneity Circuit 5000 and the Control Sign arrangement are utilized by some decision orders by gating the output of a selected index register onto the Unmasked Bus 2014 (UB), through the Mask and Complement Circuit 2000 (M&C), onto the Masked Bus 2011 (MB), and from there into the Control Homogeneity Circuit 5000 and the Control Sign Flip-Flop 5020. The contents of one of the seven index registers specified in the decision order being processed are thereby summarized in the Control Homogeneity Flip-Flop 5020 and Control Sign Flip-Flop 5413. Further gating actions associated with a decision order carry out the transfer or advance according to the output of the Decision Logic 3906 (DEC).

Similar homogeneity and sign circuits provide facilities for a class of decision orders which transfer or advance according to combinations of the homogeneity and sign of twenty-three bit words contained in the K Register 4001 (KR).

Call Processing

The principal input signals to our telephone switching system are the supervisory and call signaling signals which are associated with both subscribers' lines and trunks. The Central Processor 100 actively searches for the presence of such input signals, and, on a time shared basis, undertakes both the data processing required by such signals and all the necessary maintenance functions.

As an example of how programs are initiated and how different programs interact, let us consider a typical intra-office call. The first problem is to recognize a service request which is characterized by a subscriber's line or a trunk going from the on-hook supervisory state to the off-hook supervisory state.

The scanning of subscribers' lines to detect requests for service should be undertaken at a rate of approximately ten times per second. Statistically, requests for services are continually occurring.

The scanning of lines, trunks, and service circuits of a telephone switching system to detect requests for service, answer, abandonment, hangup, dial pulses, et cetera, comprises a substantial portion of the system's work operations. Since scanning must be accomplished in near real time, the program sequences which implement scanning must be efficiently organized if a reasonable number of lines generating reasonable amounts of traffic can be served by a single central control. Efficient program organization implies that the order structure must include program orders which are designed to maximize machine utilization of real time. Where specific jobs such as scanning are performed repetitively it is economical to include special combined program orders which may be arranged in combination with each other or in combination with more general purpose orders to provide order sequences which efficiently perform such repetitive jobs. Advantageously, the program order structure employed in our system includes a number of such combined orders which serve to perform multiple operations within central control. Multiple operation orders may impose limitations on the orders which follow closely in sequence. Such limitations merely require that orders which follow in sequence do not concurrently control the same central control elements which are controlled by the multiple function orders. Advantageously, in our telephone switching system sequences of combined orders and early transfer orders are arranged to be executed repetitively to perform the highly repetitive work operations related to scanning.

Lines, trunks, and service circuits are scanned at various rates and times for a plurality of purposes. Scanning to detect requests for service is on a continuing basis, while scanning for other purposes such as answer, hangup, abandonment, dial pulses, et cetera, is on a directed basis with respect to selected lines, trunks, and service circuits which are involved in calls. The following discussion is directed to the hardware aspects of the scanning of lines to detect requests for service without regard for the specific combinations of program orders which are employed. With this background of understanding of the flow of data through the system and the hardware responses, the combinations of sequences of program orders which are required to perform these work operations will be more readily understood.

A request for service is indicated when a line which has been previously found to be on the on-hook supervisory state is currently found to have changed to the off-hook supervisory state. The information required to detect requests for service for lines is obtained as follows:

(A) The Line Scanner 123 serves to interrogate sixteen subscribers' lines at a time to determine the current supervisory state of those lines; and (B) The busy-idle memory cells (last look cells) which are located in the Call Store 103 are a record of the supervisory states of the lines as determined by the immediately preceding scan of those lines.

The Central Control 101 processes the scanner responses and the busy-idle memory information which it obtained from the Call Store 103 as described below to detect requests for service. A consideration in the scanning of lines to detect requests for service is the data processing capacity of the Central Processor 100. During times of disaster and other circumstances which cause unusually high calling rates, the data processing capacity of the system may be inadequate to provide service to all of the calling subscribers on a near real time basis. In order to reasonably cope with this situation a system feature which is known as line load control is employed to screen requests for service to temporarily serve selected groups of subscribers' lines to the exclusion of other subscribers. Advantageously, in our system line load control, which is an extreme measure, is imposed for minimum periods of time and is negated to permit calling by all subscribers whenever there is sufficient data processing capacity available.

The rate at which traffic is generated by the subscribers' lines and trunks is capable of rapid variations. Therefore our system checks for overload conditions at relatively short intervals of time. System overload may be reflected by many system conditions including (1) network overload conditions, i.e., network blocking, and (2) failure of the system to provide dial tone within a reasonable period of time.

In our system, once every three minutes peg count and overflow count registers are examined to determine whether or not a network overload condition exists. If an overload condition is experienced, the system is considered to be overloaded for the next three minute interval.

Once every four seconds a dial tone speed test (DTST) is initiated by a dial tone test program sequence. This sequence serves to determine the period of time required for the system to establish a test dial tone connection. If dial tone delay in excess of three seconds is encountered the system is considered to be overloaded.

For the purpose of line load control, the subscribers' lines served by the office are divided into sixteen groups corresponding to the sixteen ferrods in each of the scanner rows of the Line Scanners 123. When line load control is imposed by the system upon detection of either a network overload condition or a dial tone test failure, request for service is accepted only from a selected group or groups of subscribers' lines. Line load control is implemented by means of "line load control service patterns" which are stored in the Call Store 103. Basically there are three types of line load control service patterns employed as follows:

(1) In the absence of overload, the line load control service pattern comprises a "1" in each of the sixteen group positions and thus service is rendered to all subscribers without discrimination.

(2) When line load control is employed, the line load control service pattern comprises a sixteen bit word in which a "1" occurs in each bit position associated with a group of lines to be rendered preferred service and a "0" in each bit position associated with a group of lines to be excluded service.

(3) During periods of time in which, as explained below, service is rendered not only to the selected preferred groups of subscribers' lines but, in addition, rendered to certain other groups of subscribers' lines, a variable line load control service pattern is employed and this pattern comprises a "1" in each bit position corresponding to the groups of lines which are rendered preferred service and a "1" in the bit positions assigned groups which, on a rotating basis, are rendered service.

The line load control service pattern is in effect a scanning mask which is employed to exclude, i.e., mask out requests for service from lines not rendered preferential service. As noted above, line load control is maintained only when specifically required and whenever the overload condition subsides, service is gain rendered to all subscriber lines. During the period of time that line load control is imposed, it is possible that relatively heavy traffic has been generated by the subscribers of groups not rendered preferential treatment, and that to immediately render service to all excluded subscriber groups results in "surging" of subscriber requests for service. To avoid the effects of surging, the variable line load control service pattern is employed until such time as normal traffic conditions again prevail. That is, the variable service pattern is changed once every minute to permit requests for service from different groups of lines not included in the selected groups. Thus, for example, during a given one minute interval service is rendered to a pair of nonpreferred groups of lines and one minute later service is rendered to a different pair of groups of subscriber lines. During periods of marginal overload the variable service pattern is employed to provide satisfactory service to all of the subscribers.

When request for service scanning is initiated, the head program address for this work function is found in the frequency table list of addresses. At this time, the supervisory scanning program address which is found in the program store executive program frequency table is employed to transfer system control to the request for service scanning program.

The Line Scanner 123 is employed to detect requests for service from Subscriber Stations such as 160 and 161 and the Trunk Scanners 135 and 139 are employed to detect requests for service from distant office trunks or service circuits.

Subscriber lines, for purposes of scanning, are divided into groups of sixteen lines. A command which is transmitted from the Central Control 101 to a Line Scanner 123 via the Network Command Bus System 104, serves to interrogate the sixteen ferrods of a line group. The scanner responses are returned to the Central Control 101 via the Scanner Answer Bus System 108. The scanner responses merely indicate the current states of the sixteen lines, i.e., indicate whether the individual lines are on-hook or off-hook. The current states must be compared with the prior states of these lines. There is a busy-idle cell (last look cell) associated with each of the lines served by the system and these busy-idle cells are located in groups of sixteen lines each in the Call Store 103. The program orders which are employed in the scanning of lines thus serve to (a) generate and transmit a command to a line scanner to scan a selected group of sixteen lines, and (b) generate and transmit a memory reading command which serves to interrogate the call store at the memory location associated with the busy-idle cells (last look word) of the selected group of lines scanned.

The contents of the Call Store 103 at the indicated address are returned to the central control via the Call Store Response Bus System 6501.

The call store response comprises a twenty-four bit word wherein bits 0 through 15 represent the busy-idle states of sixteen subscribers' lines, bits 16 through 21 comprise the complement of the address of the next row of ferrods to be interrogated, and bit 23 comprises a parity bit. The six row address bits are adequate to define the selected scanner row to be read because the information necessary to select the particular scanner to be read is preset in the F Register 5801.

The information on the scanner answer bus system is selectively gated through Scanner Answer Bus Gates 1400. The scanner answer information bits are transmitted to the input terminals of the Logic Register 2508. The Logic Register 2508, prior to the time of receipt of this information, was reset by an order cable signal on the conductor 25LR. Thus the individual bits of the Logic Register 2508 are selectively set by means of the single rail data on the conductors 0 through 15 of the cable 2108.

Statistically in the scanning of groups of sixteen lines the condition wherein one or more lines is requesting service occurs less frequently than the condition in which a request for service is not found. When a request for service is detected a transfer is made from the line scanning program sequence to a request for service sequence; therefore, the scanning of lines includes a decision order. In the event that none of the interrogated lines is requesting service the decision is to advance in the scanning of lines. However, if one or more of the interrogated lines is requesting service the decision is to transfer to a request for service program sequence.

A request for service is indicated when a subscriber's line which was previously not served and which was previously in the on-hook state has made a transition to the off-hook state. The busy-idle cells in the call store memory are in the "0" state when the associated subscriber's line is in the on-hook supervisory state and in the "1" state when the associated subscriber's line is in the off-hook supervisory state or is busy because his line is being rung on a terminating call.

A scanner response of "1" indicates that the line is in the on-hook state and "0" indicates that the line is in the off-hook state. The Call Store 103 response data which resides in the Data Buffer Register 2601 is gated via the Buffer Register Output Bus 2600 and cable 2015 to a first group of input terminals of the Mask and Complement Circuit 2000. The output terminals of the Logic Register 2508 are connected via cable 2509 to a second group of input terminals of the Mask and Complement Circuit 2000.

The complement of union masking, i.e., the complement of the logical OR of the scanner answer data and the busy-idle cell data (last look word) which was obtained from the call store will produce a data word on the Masked Bus 2011 in which a "1" appears in information locations associated with a line requesting service. In the Mask and Complement Circuit 2000 union masking is accomplished in an AND-OR Circuit which is enabled by an order cable signal on the conductor 20UMASK and complementing is accomplished by a Complement Circuit which is enabled by an order cable signal on the conductor 20COMP-M.

The output terminals of the Mask and Complement Circuit 2000 are connected to the Masked Bus 2011 and information on the masked bus is gated via cable 3522 and AND gate 3500 to stages 0 through 22 of the KA Input Register 3502. The information in the KA Input Register 3502 comprises in bit positions 0 through 15 an indication of the lines requesting service and bit positions 16 through 21 the binary address of the next row of ferrods to be interrogated. The binary address was obtained by complementing the complement of the binary address which was read from the call store along the busy-idle information. Prior to the time that AND gate 3500 is enabled, the KB Input Register 3504 is reset to all zeros by an order cable signal on the conductor 35 REKB. The input signals to the K Input Logic 3505 comprise the contents of the KA Input Register 3502 and an input word comprising all zeros from the KB Input Register 3504. The contents of the KA Input Register 3502 are thus transmitted to the K Register 4001 without modifications by enabling the control conductor 35OR which causes the K Input Logic 3505 to perform a logical OR of the contents of the KA Input Register 3502 and the KB Input Register 3504. The output conductors of the Logic Circuit 3505 are gated via AND gate 3506 to the input terminals of the K Register 4001.

The cells 16 through 22 of the K Register 4001 are all reset to zero by an order cable signal on the conductor 4ORS16–22. The information in the K Register 4001 thus comprises an indication of detected requests for service.

The line load control service pattern word which is employed in masking out service requests from groups of subscribers' lines not rendered preferred treatment is obtained from a specified location within the Call Store 103. As previously described, in the absence of line load control, the line load control service pattern will comprise a sixteen bit word in which all bits of the words are "1." In the presence of line load control, the line load control service pattern word comprises a "1" in every bit position associated with a subscriber group which is to be rendered service. The information in the K Register 4001, i.e., a sixteen bit word in which a "1" indicates a detected request for service, is transmitted to the KB Input Register 3504, while the line load control service pattern word is received in the KA Input Register 3502. An order cable signal on the conductor 35AND causes the K Input Logic 3505 to logically AND the contents of the KA Input Register 3502 and the contents of the KB Input Register 3504. The resultant output word of the K Input Logic 3505 comprises a sixteen bit word wherein a "1" indicates a line which is to be rendered service and which is requesting service. From this discussion, it is seen that an identical sequence of program order words is employed in the absence and in the presence of line load control and that line load control is implemented by employing different line load control service patterns.

The Homogeneity Circuit 4503 is associated with the K Register 4001 and serves to determine whether the contents of the K Register 4001 are all 0's, all 1's, or a mixture of 0's and 1's. In the present case, the only question of interest is whether or not there are any 1's in the K Register 4001 since the bits 16 through 21 have been purposely reset to zero. If no 1's exist in the K Register 4001 (homogeneity equals 1), no service request has been detected and the request for service scanning proceeds to examine the next row in this scanner. This process is continued until all rows in the particular Line Scanner, such as 123, have been interrogated at which point the job supervisory program determines the next job to be undertaken.

If, however, the Homogenity Circuit 4503 detected the preence of at least one 1 (homogeneity equals 0), the HKO Output Conductor 4516 will be enabled. This will cause a transfer to be made to a program for recording the service request in the Call Store 103 in an area called the Service Request Buffer. The HKO Conductor 4516 is one of the input conductors to the Decision Logic 3906. The Decision Logic 3906, under the influence of control signals from the Buffer Order Word Decoder 3902 and a signal on the HKO Conductor 4516 will provide an output signal on the early transfer conductor 39ETR of the conductor group 3911 indicating that a program transfer should be made. The conductor 39ETR is connected to the Order Combining Gate Circuit 3901 via conductor group 3911. In the Order Combining Gate Circuit 3901, the information on the conductor 39ETR is combined with timing signals from the Microsecond Clock 6100 to provide an order cable signal which enables the Transfer Sequencer 4401.

The Transfer Sequencer 4401 causes a program transfer to the program address which was priorly stored in the J Register 5802. The address which is obtained from the J Register 5802 is transmitted via the Unmasked Bus, the Mask and Complement Circuit 2000, the Masked Bus Cable 4313, AND gate 4308, cable 4316 to the program address register for transmission to the Program Store 102 to obtain the first order word of the request for service recording program sequence.

The output conductors 0 through 22 of the K Register 4001 are connected directly to the input terminals 0 through 22 of the Detect First-One Circuit 5415 by way of cable 4006. The function of the detect first-one circuit is to generate an output word which is a five bit binary number which defines the rightmost bit position of the K Register 4001 in which a "1" is found. This five bit binary number is gated to the masked bus via AND gate 5417. AND gate 5417 is enabled by an order cable signal on conductor 54DFUD. The output conductors of the symbolic AND gate 5417 are connected to bit positions 4 through 0 of the Unmasked Bus 2014. This information is transmitted through the Mask and Complement Circuit 2000 without alteration to the Masked Bus 2011 and from the masked bus is gated via AND gate 5800 to the input conductors 0 through 4 of the First-One Register 5801.

The three elements which are required to compile a word which is to be stored in the Service Request Buffer are now available. That is, the identity of the particular line within a row which is requesting service is stored in the First-One Register 5801, the identity of the particular row in which the service requesting line resides can be deduced from the row information which is found in bit positions 16 through 21 of the KA Input Register 3502, and the identity of the particular scanner under consideration can be obtained by interrogating the call store at the location at which this information, as previously described, was stored at the beginning of the service request scan. These three elements are compiled into a single word by means of a series of general purpose program actions and after compilation are stored in the Call Store Memory 103 in the Service Request Buffer. Having recorded sufficient information to identify a line requesting service it must next be determined whether or not other lines within the previously scanned group of lines are requesting service. This is accomplished by modifying the service request word which contains a "1" in each bit position representing a service request to eliminate the "1" in the bit position whose request has been recorded and then examine the remainder of the word for homogeneity. If homogeneity exists, there is a return to the scanning of subsequent lines; however, if homogeneity does not exist, the service request recording program is again repeated. This process is continued until all lines requesting service within a scanned group of lines have been served by the service request recording program.

In addition, it is necessary to mark lines whose service request has been recognized busy by writing a "1" in the line state memory of each of these lines.

The service request scan program is then continued until all rows of a scanner have been completed. At this time a transfer is made to the job supervisory program which will decide what job is to be performed next.

With this understanding of the hardware actions employed in the scanning of lines to detect requests for service, we will now proceed to a discussion of the program sequences for the execution of service request scanning. To maximize call handling capability of our system the service request scanning is performed with sequences of special program orders which are designed to most efficiently carry out the required gating actions. The service request scan program consists, as shown in FIG. 10A, of three parts:

(A) On initialization program sequence;
(B) Scanning program body; and
(C) Completion program sequence.

The initialization program sequence places a selected transfer code-address into the J Register 5802, places the CPD address of a selected one of the Line Scanners 123 into the First-One Register 5801, and carries out a short program sequence of orders of progressively increasing complexity leading into the body of the service request scan program.

Figure 12:
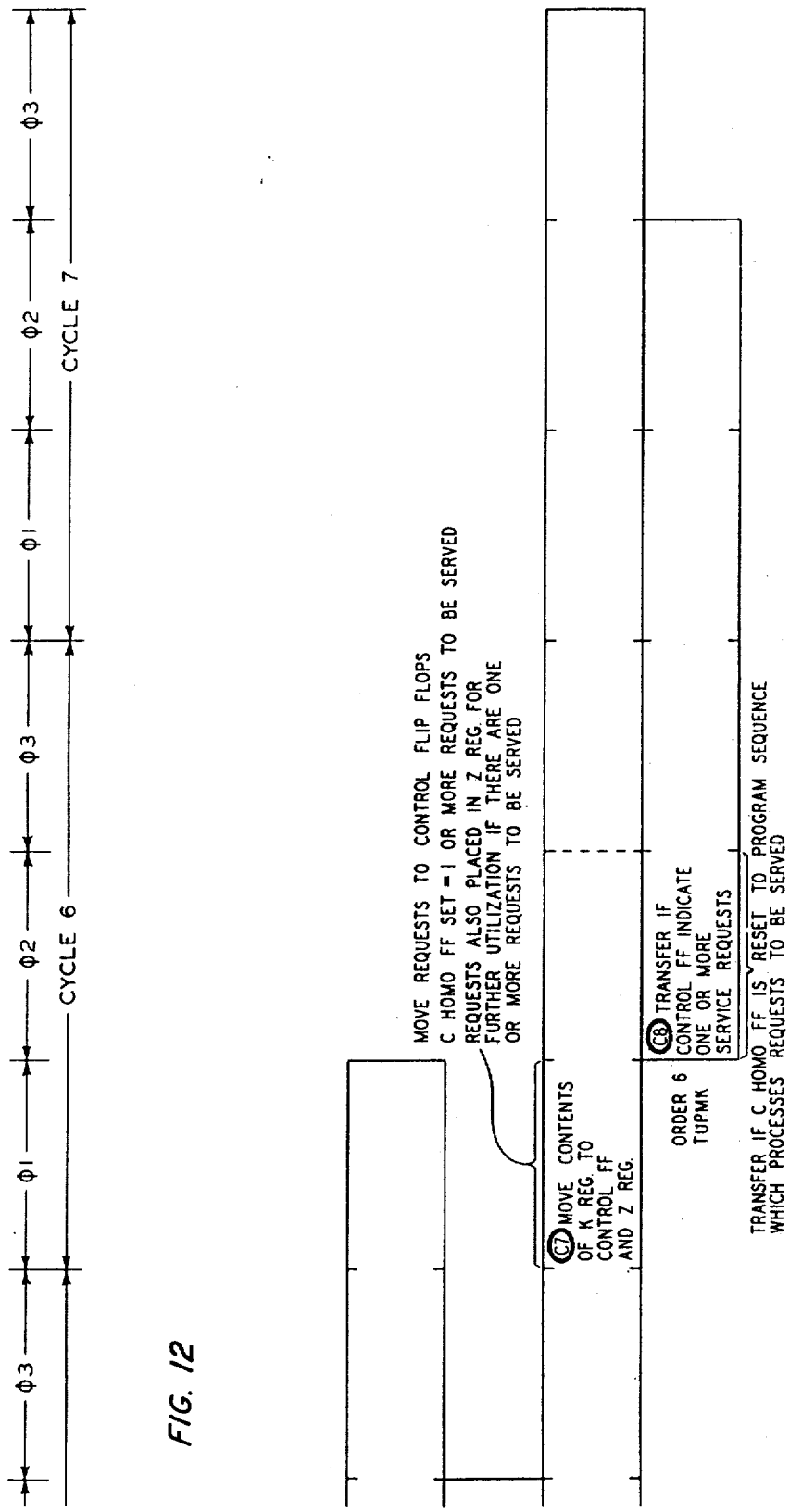

The body of the service request program consists of an overlapped program sequence which sequentially scans a number of groups of sixteen subscriber lines. A segment of this sequence is depicted in FIGS. 10–12 and shows the execution in sequence of the orders numbered 1, 2, 3, 4, 5, 6 which consist of repeated couplets of the combined order KMKUS and the early transfer order TUPMK. FIGS. 10–12 also show the overlapping of gating actions for the repeated couplets, and details the sequence of gating action associated with the scanning of a group of sixteen lines labeled C and a detailed description relating to these figures follows.

As indicated, the body of the service request scan program consists of a tightly interwoven overlapping sequence of gating actions; to end this sequence selected program orders are utilized which provide the completion of gating actions for the scanning of the last group of lines, but do not include initial gating actions for scanning additional groups of sixteen customer lines. The completion program sequence consists of a short sequence of orders with progressively decreasing complexity and ends with the transfer of program control to the appropriate job supervisory program.

The tightly interwoven sequence of repeated couplets comprising the body of the service request scan program advantageously employ the combined order KMKUS and the early transfer order TUPMK which are specifically designed to permit the maximum rate of data processing in the service request scan program. The integration of the gating actions among the various repeated couplets may be described with the aid of FIGS. 10–12 in the scanning of sixteen lines C. All of the gating actions comprising the service request scan of the sixteen lines C are distributed among the orders 1 through 6 as indicated by comments numbered C1, C2 . . . C8. The number C1 refers to the first gating action, the number C2 refers to the second gating action in sequence, et cetera. Accordingly, the numbers B3, B4, et cetera, and A7 and A8 refer to corresponding gating actions in the preceding scan of the sixteen lines B, and the still earlier scanning of the sixteen lines A. Not shown, but in actuality part of the continuing sequence, are gating actions which comprise part of the service request for sixteen lines D and the sixteen lines E are performed among the gating actions of the orders 3, 4, 5, and 6. Further orders not shown in FIG. 12 continue the interwoven sequence through scanning on the sixteen lines D, the scanning of the sixteen lines E, et cetera.

The KMKUS order (order 1) includes at its execution the following steps:

(1) *Steps C1 and B3.*—A call store command is generated and transmitted to obtain a twenty-three bit word which includes the last look memory cells of the sixteen lines B and the complement of the binary scanner row address for the next group of sixteen subscriber lines. Accordingly, the step B3 to obtain the last look information for sixteen lines B also comprises the first step of C1 in scanning the sixteen lines C.

(2) *Step A7.*— The contents of the K Register 4001 are placed in the Z Register 3002 and are further summarized in the Control Homogeneity Flip-Flop 5020 and the Control Sign Flip-Flop 5413. This is the next to last step performed in the service request scan of the sixteen lines A; in this step the sixteen bit word placed in the Z Register 3002 contains a "1" for only those bit positions corresponding to lines for which service requests are to be processed by Central Control 101. If such requests exist the word placed in the Z Register 3002 will contain one or more "1's" and the control Homogeneity Flip-Flop 5020 will be reset. If, however, no requests are to be served, the control Homogeneity Flip-Flop 5020 will be set. Moving the contents of the K Register 4001 into the Z Register 3002 makes available the K Register 4001 for further data processing of the service request scan for the sixteen lines B.

(3) *Step B4.*—Gating actions B4 combines the last look information (appearing in the Data Buffer Register 2601 in response to gating actions B3) and the scanner answer appearing in the Logis Register 2508 in the Mask and Complement Circuit 2000. The two inputs are ORed and the combination complemented; this result is then transmitted to the KA Input Register 3502 and the K Register 4001. Since the last look information is accompanied by the complement of the scanner address of the sixteen lines C, step B4 places the scanner row address into the KA input Register 3502 in preparation for step C2.

(4) *Step C2.*—The step C2 uses the scanner address just obtained and the CPD address priorly placed in the F Register 5801 to execute a scanner command. The Command Order Sequencer 4902 is activated to obtain the scan of the sixteen lines C which is returned and placed in the Logis Register 2508 by phase 1 of cycle 4.

The execution of the TUPMK order, order No. 2, includes the following steps:

(1) Step A8 consists of making the decision based on the state of the Control Homogeneity Flip-Flop 5020. If the flipflop is reset implying that a service request is to be processed, the Transfer Sequencer 4401 is activated to effect transfer to the program sequence which initiates the required data processing. The contents of the J Register 5802 which had been preset in the initial program sequence provides the transfer code-address.

(2) If the decision is made not to transfer, that is, no service request for the sixteen lines A are to be processed, then the PMK portion of the TUPMK order is executed. The PMK portion includes step B5. This step generates and transmits a call store read command to obtain the scan mask for the sixteen lines B. It is this step in conjunction with the step B6 that carries out any required line load control functions.

(3) Step B6 uses the scan mask obtained by step B5 in the Data Buffer Register 2601 and combines this word with the present contents of the K Register 4001 in an AND operation and places the result in the K Register 4001.

In the execution of the KMKUS and TUPMK orders it is to be noted that only part of the steps associated with the scanning of the sixteen lines C is performed, but in addition, certain parts associated with the service request scan of the sixteen lines A and B are performed.

Having demonstrated that a couplet of orders KMKUS and TUPMK carry out different sequences of gating actions associated with the scanning of three different groups of sixteen lines, the gating actions associated with the scanning of one group of sixteen lines C as distributed among the execution of the orders 1 through 6 of FIGS. 10–12 can be indicated.

C1.—A call store command is transmitted to obtain the row address to be used in the scanning of the sixteen lines C.

C2. The Command Order Sequencer 4902 is activated to carry out the network command to a selected one of the Scanners 123 as controlled by the CPD address and CPD execute information previously placed in the First-One Register 5801 for which the scanner row address (obtained in response to the gating action C1) appears in the KA Input Register 3502. The Command Order Sequencer 4902 is activated during phase 3 of cycle 2 and returns to the inactive state at the end of phase 1 of cycle 4 when the scanner answer is returned and placed in the Logic Register 2508.

C3.—In the execution of order No. 3, a KMKUS order, a call store reading command is again generated, but in this instance the code-address generated in the indexing cycle specifies the memory location containing the last look information of the sixteen lines C.

C4.—The previous gating action, C2, causes the appearance of scanned state information of the sixteen lines C in the Logic Register 2508 by phase 1 of cycle 4; the gating action C3 results in the appearance in the Data Buffer Register 2601 of the associated last look information, also by the end of phase 1 of cycle 4. C4 consists of combining these two sixteen bit words in the OR operation and the complementing of the resulting combination in the Mask and Complement Circuit 2000. The complemented combination appearing on the Masked Bus 2011 contains a "1" only in those positions for which (1) the scanner answer of the associated line in the group of sixteen lines A indicates an "off-hook" condition, and (2) for which the busy-idle information indicates that the line was idle. The resulting word which also contains a scanner row address is transmitted to the KA Input Register 3502 via the Masked Bus 2011.

C5.—Assuming, only for purposes of explanation, that the transfer is not to be made for the service request scan of the sixteen lines B, then step C5 generates and transmits a call store reading command to obtain the scan mask for the possible application of line load control to the scan of the sixteen lines C.

C6.—The scan mask requested in step C5 has appeared in the Data Buffer Register 2601 by phase 1 of cycle 5. Step C6 combines in and AND operation (accomplished within the K Input Logic 3505) the contents of the K Register 4001 as priorly transmitted to the KB Input Register 3504 and the scan mask as placed in the KA Input Register 3502. The masked service requests are then placed in the K Register 4001.

C7.—In the execution of order 5 the gating action C7 transmits the word formed in step C6 from the K Register 4001 to the Z Register 3002 and the control flip-flops via the Unmasked Bus 2014, the Mask and Complement Circuit 2000 and the Masked Bus 2011.

C8.—In the execution of order 6, the early transfer order TUPMK, a decision is made to transfer program control if the Control Homogeneity Flip-Flop 5020 was reset by step C7. If, however, that flip-flop is set, the service request scan program continues with sixteen lines D, et cetera. Therefore, if one or more of the sixteen lines C have indicated a service request not excluded by the scan mask and not previously recognized in the execution of call processing sequences, then a transfer is made to a program sequence which examines the contents of the Z Register 3002 to determine and perform the required work operations for the corresponding one or more of the sixteen lines C.

In the description of the sequence of gating actions associated with the scanning of the sixteen lines C as depicted in FIGS. 10–12 it was assumed that neither the transfer order 2 or 4 (both TUPMK orders) effected a transfer. However, if a transfer is made in the execution of either order No. 2 or order No. 4 then, as can be seen from studying FIGS. 10–12, the continuation of the latter steps for the sixteen lines B and/or the sixteen lines C is abandoned. Therefore, when a return to the service request scan program is made to continue its execution, these missing latter steps must be provided in returning to that program sequence.

In the design of the program orders KMKUS and TUPMK to carry out all of the gating actions required for the service request scan program alternatives exist in some instances as to which of the orders (KMKUS or TUPMK) is to perform certain of the gating actions. The assignment of such gating actions to one of the orders is made in such a way that if at any time in the sequence of gating actions additional cycles are to be inserted to carry out the correction or other remedial gating actions of program order words or data obtained from memory, then the service request scan program is not mutilated or changed except for additional 5.5 microsecond cycles of time to complete that program.

For example, assume that order No. 3, a KMKUS order, is delayed by one, two, or three 5.5 microsecond cycles to carry out correction, rereading, or rereading and correction of that order. The dotted line in FIG. 11 indicates where the one, two, or three 5.5 microsecond cycles are inserted. During the extra inserted cycles the Logic Register 2508 retains the answer from the scanner associated with the sixteen lines C and the K Register 4001 also retains service requests associated with the sixteen lines B. Further gating actions in the execution of order No. 3, order No. 4, et cetera, associated with the scanning of the sixteen lines B, the sixteen lines C, and the sixteen lines D would be continued one, or two, or three 5.5 microsecond cycles later without the loss of pertinent information in relation to any of the three groups of sixteen lines being scanned.

The compatibility of the tightly overlapped service request scan program with the randomly occurring insertion of 5.5 microsecond cycles for automatic remedial gating actions also applies to those instances where an interrupt is generated in the midst of execution of the service request scan program. The service request scan program can be interrupted, and upon completion of the interrupt program, control can be returned to the service request scan program by means of the execution of the GBN order without mutilating any of the scanning steps.

A similar application of repeated couplets of the specially designed combined order KMKXS and the early transfer order TUPMK serve to maximize the rate of data processing in the supervisory scanning of trunk and service circuits in our system to detect requests for service and hangups. As explained with respect to the scanning of subscribers lines, scanning at the subscriber ferrod is intended only to detect requests for service and not hangups. The couplet of orders KMKUS and TUPMK serve to provide a service request word wherein there is a 1 in each bit position associated with a line requesting service, i.e., a line which has changed from the on-hook to the off-hook state. The scanning of trunks and service circuits has as its objective the generation of a 16-bit word wherein there is a 1 in each bit position associated with a trunk or service circuit which has changed either from on-hook to off-hook or from off-hook to on-hook. The combined order KMKXS provides the EXCLUSIVE OR of the trunk last-look information and the trunk scanner response information and thus provides the desired word. That is, the trunk scanning sequence to detect both requests for service and hangups differs from the line scanning sequence in that the last-look information and the scanner response information is combined by the process of logical EXCLUSIVE OR process rather than by union.

In the scanning of trunk circuits and service circuits to detect requests for service and hangups, masking is employed to mask out changes in supervisory state of trunks or service circuits which are in either a transition state or in a state in which changes in supervisory state do not reflect a request or a hangup. For example, when dialing is in progress supervisory changes are not reflective of either a request for service or a hangup therefore such changes must be disregarded. This masking is similar to line load masking which is employed in the scanning of lines.

We claim:

1. A program controlled telephone switching system comprising:
   a plurality of groups of communication paths;
   scanner means responsive to scanner commands for simultaneously determining the supervisory states of a group of said communication paths and for generating scanner output signals;
   a central data processor comprising:
   memory means containing sequences of program order words and
   a plurality of words of data,
   a central control responsive to said sequences of program order words for generating said scanner command signals;
   said data stored in said memory means comprising communication path last look entries,
   said last look entries arranged in word groups, each of said word groups corresponding to one of said groups of said communication paths,
   means in said central control for reading said last look word groups from said memory means,
   means in said central control for logically combining said scanner output signals and said last look data read from said memory means for generating a service request word wherein there is a discrete indication for each communication path of said group requesting service.

2. A telephone switching system in accordance with claim 1, wherein
   said scanner output signals comprise:
   a "1" for each scanned line which is currently in the on-hook state,
   and a "0" for each scanned line which is in the off-hook state;
   said last look data word comprises:
   a "1" in each bit position corresponding to a line which was previously in the off-hook state and a "0" for each line which was in the on-hook state;
   and wherein said means for logically combining comprises:
   means for generating the complement of the logical OR of said scanner output word and said last look data word.

3. A program controlled telephone switching system comprising a plurality of groups of lines; scanner means responsive to scanner commands for determining the supervisory states of said lines and for generating corresponding scanner output signals;
   a central data processor comprising:
   memory means containing sequences of program order words and data,
   a central control for reading information from said memory means and for generating commands for controlling said scanner means;
   means in said central control responsive to said sequences of program order words, to said output signals of said scanner means and to data obtained from said memory means for simultaneously detecting requests for service from group of said lines and for generating a service request word wherein there is a "1" for each line requesting service, means responsive to said requests for service, means in said central data processor for detecting a system traffic overload condition, and means responsive to an overload indication for precluding responses to requests for service from all but certain preferred service lines in each of said groups of lines.

4. A telephone switching system according to claim 3, wherein said means for detecting requests for service comprises:

means for logically combining a scanner output signal word representative of the supervisory states of a group of lines and a last look word representative of the supervisory states of said group of lines as determined by an immediate preceding scan and wherein said means for precluding comprises means for logically combining said service request word with a line load mask word to provide a masked service request word.

5. A telephone switching system in accordance with claim 4, wherein said line load mask word comprises a data word stored in said memory means.

6. A program controlled telephone switching system comprising:

a plurality of groups of lines, selected lines of said groups being preferred service lines;

scanner means for determining the supervisory states of said lines and said trunks and for generating corresponding output signals;

a central data processor comprising memory means containing sequences of program order words and data, a central control for reading information from and writing data into said memory means and for generating commands for controlling said scanner means;

means in said central control responsive to said sequences of program order words, to said output signals of said scanner means and to data obtained from said memory means for simultaneously detecting requests for service from a group of said lines and for generating a service request word wherein there is a "1" for each line requesting service, and means responsive to said service request words;

means in said central data processor for detecting a system traffic overload condition, means responsive to an overload indication for precluding central control responses to requests for service from all but said preferred service lines during said system overload condition, means for detecting an abatement of said system traffic overload condition, and means responsive to said last named means for causing said central control to respond to requests for service from all of said lines.

7. A telephone switching system in accordance with claim 6, wherein said means for causing said central control to respond to requests for service from all of said lines includes timing means for defining discrete variable line load periods of time, and means for causing said central control to respond to requests for service from different ones of said lines of each of said groups during each succeeding variable line load control period of time.

8. The method of detecting requests for service from subscriber lines of a program controlled telephone switching system including a data store comprising the following steps:

(a) simultaneously scanning a group of lines to generate a scanner response word wherein there is a "1" for each line in the on-hook state and wherein there is a "0" for each line in the off-hook state;

(b) reading from said data store a line last look word associated with the group of lines scanned;

(c) logically combining said scanner response word with said last look word to provide a service request word which is the complement of the logical OR of these two words;

(d) reading a line load control masking word from said data store;

(e) logically combining said service request word and said line load control masking word to provide a masked service request word which is a logical AND of said service request word and said masking word;

(f) recording the identity of each preferred line of the group of lines which was previously in the on-hook state as indicated by the last look word and which is found to be currently in the off-hook state as determined by the scanner response word.

9. A telephone switching system comprising:

a plurality of groups of lines, scanner means responsive to scanner commands for determining the supervisory states of said groups of said lines;

a central data processor comprising:

a program store containing sequences of program order words, a data store comprising means for recording a plurality of words of data, a central control responsive to said sequences of said program order words for generating said scanner commands, and commands for addressing said data store;

said sequences of program order words including a request for service sequence comprising repeated couplets of a first order word and a second order word, and a request for service recording sequence;

said central control comprising:

a plurality of means responsive to said first order word of each of said couplets to perform different operational steps with respect to the detection of requests for service from a plurality of groups of said first, second and third subscriber lines;

said central control further comprising:

means responsive to said second order word of each of said couplets to transfer control of said central control to said service request recording program sequence in response to an indication that a request for service has originated from one of the lines of the first group of said plurality of groups of subscriber's lines; and means which in the absence of such an indication,
  (a) cause said central control to perform operational steps with respect to the second group of saaid plurality of groups of subscriber lines; and
  (b) cause said central control to advance to the first order word of the immediately succeeding couplet of order words, said central control being responsive to said first order word of said immediately succeeding couplet and effective to perform different operational steps with respect to all of said plurality of groups other than said first group and with respect to an additional group of said subscriber lines.

10. A telephone switching system comprising:

a plurality of groups of lines, scanner means responsive to scanner commands for determining the supervisory states of said groups of said lines;

a central data processor comprising:
- a program store containing sequences of program order words,
- a data store comprising means for storing a plurality of words of data,
- a central control responsive to said sequences of said program order words for generating said scanner commands, and commands for addressing said data store;
- said sequences of program order words including a request for service sequence comprising repeated couplets of a first order word and a second order word, and a request for service recording sequence;
- said central control being responsive to said first order word of each of said couplets to perform different operational steps with respect to the detection of requests for service from first, second and third groups of subscriber lines;
- said central control being responsive to said second order word of each of said couplets to transfer control of said central control to said service request recording program sequence upon detection of a request for service from one of said lines of said first group; and, in the absence of such a request, to perform operational steps with respect to said second group of lines and to concurrently advance control of said central control to the first order word of the immediately succeeding couplet of order words to perform operational steps with respect to said second, said third, and a fourth group of said lines.

11. A telephone switching system comprising
a plurality of groups of communication paths,
a switching network for selectively interconnecting said paths,
scanning means responsive to scanner commands for generating scanner responses representative of the supervisory states of communication paths of said groups,
a central data processor for detecting requests for service from said groups of communication paths comprising a program store containing sequences of program order words, a data store and a central control comprising clock means defining discrete central control machine cycles;
means in said central control for generating scanner commands at a maximum rate of once every two said machine cycles,
means in said central control for reading information from said stores,
said central control being responsive, with respect to a single group of lines, to said information read from said stores and to said scanner responses over a period of six said machine cycles,
said central control responsive during each said machine cycle to information relating to a plurality of groups of lines whereby said central data processor processes the scanning of groups of subscriber lines to detect requests for service at the maximum rate at which said scanner commands are generated.

12. A telephone switching system comprising:
a plurality of groups of communication paths,
a switching network for selectively interconnecting said paths,
scanning means responsive to scanner commands for generating scanner responses representative of the supervisory states of communication paths of said groups,
a central data process for detecting a request for service from said groups of communication paths comprising:
a program store containing sequences of program order words,
a data store and
a central control comprising clock means defining discrete central control machine cycles;
means in said central control for generating said scanner commands at a maximum rate of once every $n$ said machine cycles,
means in said central control for reading said information from said stores,
said central control being responsive, with respect to a single group of lines, to said information read from said stores and to said scanner responses over a period of $mn$ said machine cycles, $m$ being greater than 1,
said central control also being responsive during each said machine cycle to information relating to a plurality of groups of lines whereby said central data processor processes the scanning of groups of subscriber lines to detect requests for service at the maximum rate at which said scanner commands are generated.

13. In combination,
input means responsive to command signals for generating processor input data words,
a central data processor for processing said input data words comprising:
- memory means containing sequences of program order words and data and a central control comprising clock means defining discrete central control machine cycles;
- means in said central control for generating said command signals at a maximum rate of one command signal evenry $n$ said machine cycles,
- means in said central control for reading information said memory means.
- said central control being responsive, with respect to each of said input data words, to said information read from said memory means and to said input data word over a period of $mn$ said cycles, where $m$ is greater than 1.
- said central control also being responsive during each said machine cycle to information relating to a plurality of input data words whereby said central data processor processes said data at the maximum rate at which said command signals are generated.

References Cited
UNITED STATES PATENTS 3,281,539  10/1966  Dunlap et al.

KATHLEEN H. CLAFFY, Primary Examiner

T. W. BROWN, Assistant Examiner

U.S. Cl. X.R.

179—18; 340—172.5

PO-1050
(5/69)

UNITED STATES PATENT OFFICE
CERTIFICATE OF CORRECTION

Patent No. 3,517,123      Dated June 23, 1970

Inventor(s) John A. Harr, Frank F. Taylor, Werner Ulrich

It is certified that error appears in the above-identified patent and that said Letters Patent are hereby corrected as shown below:

Column 32, line 75, after "from" insert --a--.

Column 33, line 18, change "immediate" to --immediately--.

Column 34, line 59, change "saaid" to --said--.

Column 36, line 5, change "process" to --processor--;

line 41, change "evenry" to --every--;

line 43, before "said memory means" insert --from--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents